United States Patent
Minami et al.

(10) Patent No.: US 11,143,247 B2
(45) Date of Patent: Oct. 12, 2021

(54) CLUTCH DRIVE DEVICE AND VEHICLE

(71) Applicant: YAMAHA HATSUDOKI KABUSHIKI KAISHA, Iwata (JP)

(72) Inventors: Kengo Minami, Iwata (JP); Yoshiki Terashima, Iwata (JP); Yu Sekiya, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 101 days.

(21) Appl. No.: 16/455,884

(22) Filed: Jun. 28, 2019

(65) Prior Publication Data

US 2019/0316639 A1 Oct. 17, 2019

Related U.S. Application Data

(63) Continuation-in-part of application No. PCT/JP2017/047198, filed on Dec. 28, 2017.

(30) Foreign Application Priority Data

Dec. 29, 2016 (JP) .............................. JP2016-257438

(51) Int. Cl.
  *F16D 23/12* (2006.01)
  *F16D 28/00* (2006.01)
  *F16D 13/52* (2006.01)

(52) U.S. Cl.
  CPC ............. *F16D 23/12* (2013.01); *F16D 28/00* (2013.01); *F16D 13/52* (2013.01)

(58) Field of Classification Search
  CPC .......... F16D 23/12; F16D 28/00; F16D 13/52; F16D 13/56; F16D 2013/565
  See application file for complete search history.

(56) References Cited

U.S. PATENT DOCUMENTS

| 4,671,400 A | 6/1987 | Grunberg et al. |
| 4,750,596 A | 6/1988 | Grunberg et al. |

(Continued)

FOREIGN PATENT DOCUMENTS

| CN | 1991193 A | 7/2007 |
| CN | 103097756 A | 5/2013 |

(Continued)

OTHER PUBLICATIONS

Office Action dated Jul. 27, 2020 issued in the corresponding European Patent Application No. 17885966.6 corresponding to a relevant U.S. Appl. No. 16/445,998.

(Continued)

*Primary Examiner* — Charles A Fox
*Assistant Examiner* — Lori Wu
(74) *Attorney, Agent, or Firm* — Rabin & Berdo, P.C.

(57) ABSTRACT

A clutch driving device having a self-lock function includes a friction mechanism that generates a friction force in a direction opposite to a rotation direction of rotation transferred by a transfer mechanism that transfers an output of a motor to a clutch. The friction mechanism includes a rotation body that rotates by the force in the rotation direction transferred by the transfer mechanism, a friction plate that generates a friction force by contact with the rotation body, and a spring that biases the friction plate toward the rotation body such that the rotation body and the friction plate are brought into contact with each other. An intermediate shaft of the transfer mechanism includes a rotation transfer portion that rotates together with the rotation body and is movable in the axial direction relative to the rotation body.

14 Claims, 13 Drawing Sheets

(56) References Cited

U.S. PATENT DOCUMENTS

| | | |
|---|---|---|
| 5,678,671 A | 10/1997 | Leimbach et al. |
| 6,269,926 B1 | 8/2001 | Lemoine et al. |
| 10,563,703 B2 | 2/2020 | Kim |
| 2006/0101603 A1 | 5/2006 | Yagi |
| 2006/0169562 A1 | 8/2006 | Kosugi |
| 2013/0334004 A1 | 12/2013 | Eguchi et al. |
| 2020/0166109 A1* | 5/2020 | Funasugi ................ F16D 13/56 |

FOREIGN PATENT DOCUMENTS

| | | |
|---|---|---|
| CN | 103511506 A | 1/2014 |
| CN | 103836090 A | 6/2014 |
| CN | 104011416 A | 8/2014 |
| CN | 104736872 A | 6/2015 |
| CN | 105757138 A | 7/2016 |
| CN | 105934595 A | 9/2016 |
| CN | 106164521 A | 11/2016 |
| DE | 19723394 A1 | 12/1997 |
| EP | 0220092 A1 | 4/1987 |
| EP | 0220092 B1 | 12/1989 |
| EP | 2336587 A1 | 6/2011 |
| EP | 2431626 A1 | 3/2012 |
| EP | 2899420 A2 | 7/2015 |
| EP | 3104040 A1 | 12/2016 |
| GB | 2313885 A | 12/1997 |
| JP | S60-241526 A | 11/1985 |
| JP | S62-98032 A | 5/1987 |
| JP | S63-63225 U | 4/1988 |
| JP | H1081158 A | 3/1998 |
| JP | 2000-501826 A | 2/2000 |
| JP | 2000201826 A | 7/2000 |
| JP | 2002-309610 A | 10/2002 |
| JP | 2003-528273 A | 9/2003 |
| JP | 2006-170227 A | 6/2006 |
| JP | 2006-214478 A | 8/2006 |
| JP | 2012-062966 A | 3/2012 |
| JP | 2013-133887 A | 7/2013 |
| JP | 2015-072024 A | 4/2015 |
| JP | 2015-148258 A | 8/2015 |
| KR | 101304193 B1 | 9/2013 |
| WO | 2016024557 A1 | 2/2016 |

OTHER PUBLICATIONS

Office Action dated Jul. 27, 2020 issued in a relevant European Patent Application No. 17888622.2 corresponding to a relevant U.S. Appl. No. 16/455,169.

Office Action dated Jul. 27, 2020 issued in the corresponding European Patent Application No. 17887360.0 that corresponds to the present application.

Office Action dated Sep. 2, 2020 issued in the corresponding Canadian Patent Application No. 3,047,909 that corresponds to the present application.

Office Action dated Sep. 23, 2020 issued in a relevant Indonesian Patent Application No. P00201905440 corresponding to a relevant U.S. Appl. No. 16/445,998.

Office Action dated Sep. 23, 2020 issued in a relevant Indonesian Patent Application No. P00201905442 corresponding to a relevant U.S. Appl. No. 16/455,169.

Office Action dated Sep. 23, 2020 issued in the corresponding Indonesian Patent Application No. P00201905441 that corresponds to the present application.

* cited by examiner

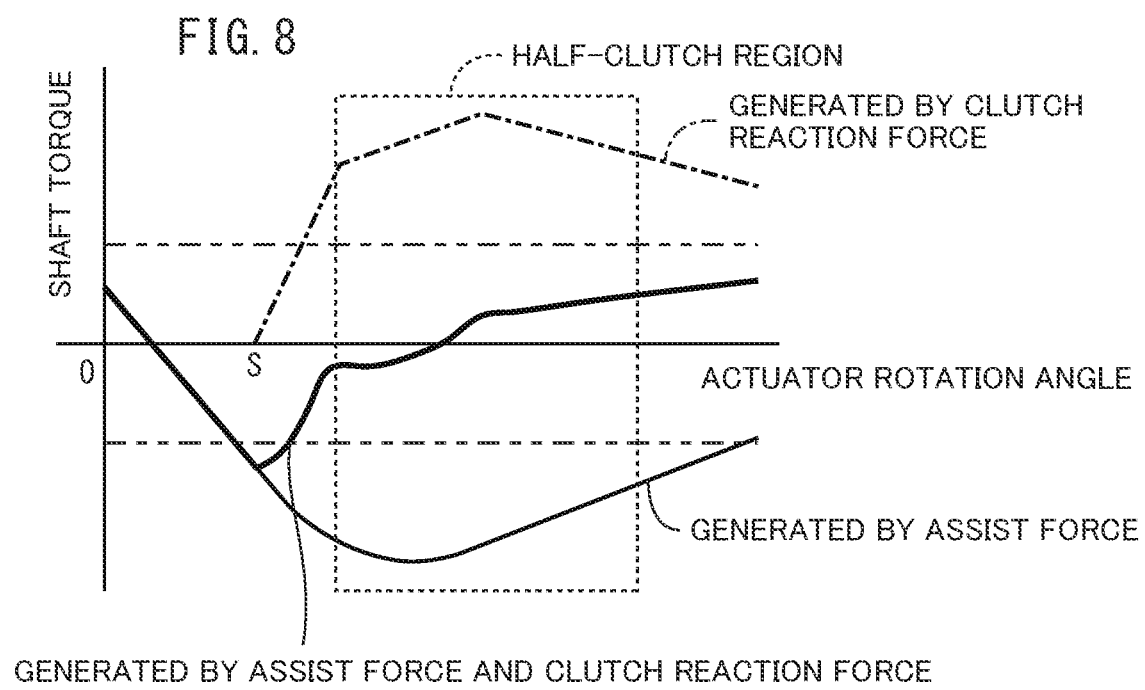

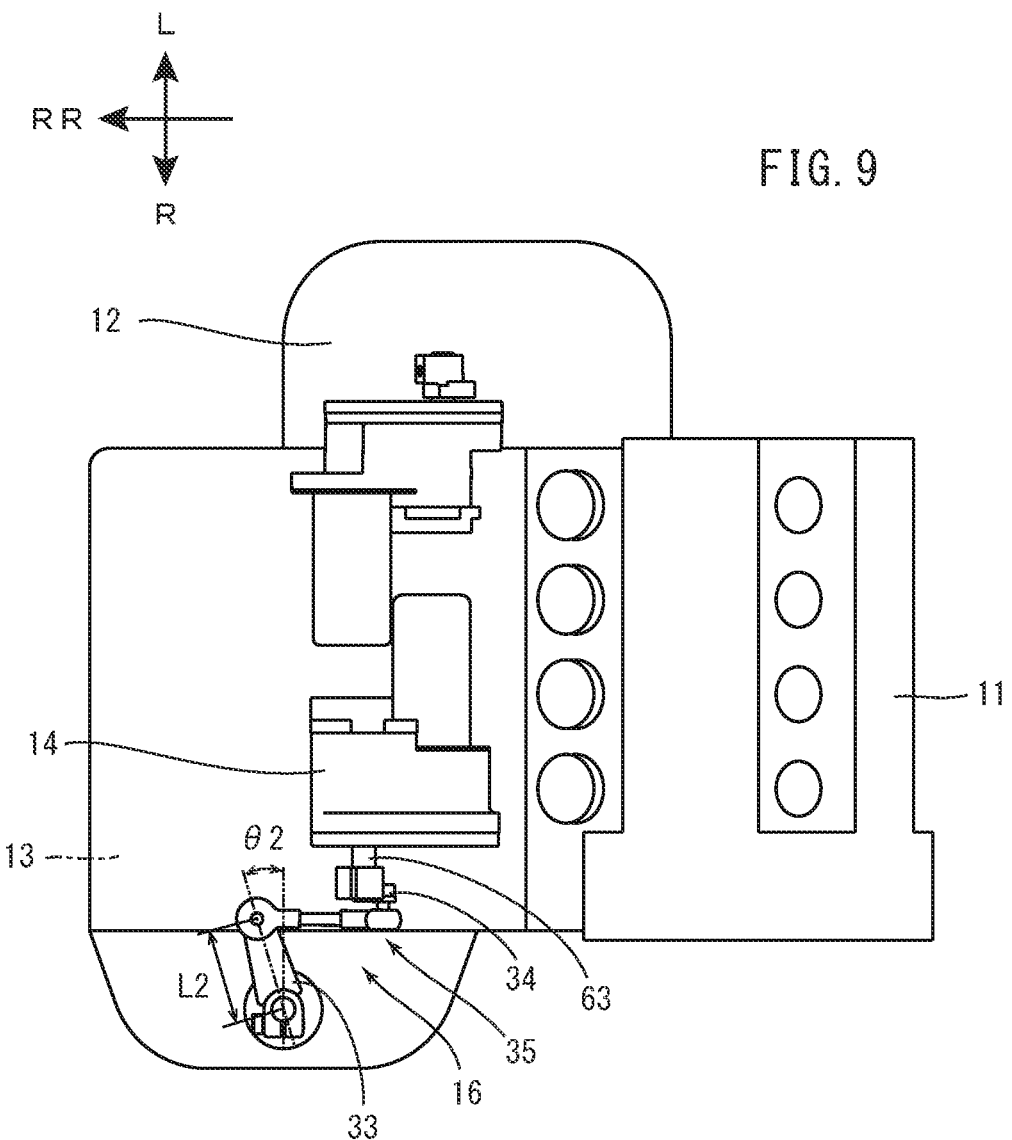

CLUTCH DRIVE DEVICE AND VEHICLE

CROSS-REFERENCES TO RELATED APPLICATIONS

The present application is a continuation-in-part application of International Application No. PCT/JP2017/047198, filed on Dec. 28, 2017, and having the benefit of the earlier filing date of Japanese Application No. 2016-257438, filed Dec. 29, 2016. The content of each of the identified applications is incorporated herein by reference in its entirety.

BACKGROUND

Technical Field

The present teaching relates to a clutch driving device for driving a clutch.

Background Art

A known clutch driving device includes a driving unit for driving a clutch and a transfer mechanism for transferring rotation output from the driving unit to the clutch. A known example of such a clutch driving device is a configuration including a worm gear pair that can rotate a worm wheel by a worm but cannot rotate the worm by the worm wheel, that is, has a so-called self-lock function. That is, as a clutch driving device, a configuration having a self-lock function has been proposed.

As a clutch driving device as described above, Patent Document 1 (identified further on), for example, discloses a configuration including a clutch rod for disengaging a clutch and an electric motor for operating the clutch rod through a worm gear pair. In the configuration disclosed in Patent Document 1, the worm gear pair incorporates a friction device for generating a friction moment. The friction moment of a friction plate of the friction device is maintained even upon application of a strong vibration exerted by an internal combustion engine.

Specifically, in the configuration disclosed in Patent Document 1, the friction device has a friction surface disposed between an end face of the worm wheel and a housing wall parallel to the end face. In the friction device, to press the worm wheel against the housing wall with the friction plate interposed therebetween, a spring plate exerts an axial force on the worm wheel.

CITATION LIST

Patent Document

Patent Document 1: Japanese Unexamined Patent Application Publication (Translation of PCT Application) No. 2003-528273

In a clutch driving device having a self-lock function as disclosed in Patent Document 1 mentioned above, there has been a demand for increasing responsiveness of a transfer mechanism. To increase responsiveness of the transfer mechanism, an efficient worm is needed. In this case, however, a friction force for achieving the self-lock function needs to be reduced, resulting in degradation of the self-lock function.

Thus, in the clutch driving device having the self-lock function, it has been difficult to achieve both the self-lock function and responsiveness of the transfer mechanism.

SUMMARY OF THE INVENTION

The present teaching has an object of obtaining a configuration, in a clutch driving device having a self-lock function, that is capable of increasing responsiveness of a transfer mechanism while maintaining the self-lock function.

For a clutch driving device having a self-lock function as described in Patent Document 1, inventors of the present teaching intensively studied how to increase responsiveness of a transfer mechanism.

To increase responsiveness of the transfer mechanism, it may be effective to increase a transfer efficiency of a gear, for example. In this case, it is necessary to increase the number of ridges of a worm or to change the angle of teeth. If the transfer efficiency is increased by changing the configuration of the worm in this manner to change the contact angle between the worm and the worm wheel, however, the self-lock function degrades.

On the other hand, it may also be effective to increase a friction force of the friction device in order to maintain the self-lock function. To increase the friction force of the friction device, it may be effective to increase an elastic restoring force of a spring plate of the friction device. When the elastic restoring force of the spring plate is increased, however, responsiveness of the transfer mechanism degrades.

For these reasons, it has been difficult in the clutch driving device having the self-lock function to achieve both maintaining of the self-lock function and an increase in responsiveness of the transfer mechanism.

The inventors further studied a configuration in which the elastic restoring force of the spring plate is increased as described above, to find that a friction force exerted on the friction plate by the spring plate causes degradation of responsiveness in the transfer mechanism.

Specifically, through the intensive study, the inventors of the present teaching intensively studied to find the following.

In the configuration disclosed in Patent Document 1, the friction device is provided in the worm wheel. This worm wheel can be tilted during rotation by a thrust force from a worm gear in some cases. Then, variations occur in the pressure of the worm wheel against the friction plate and the housing wall. Accordingly, the friction force exerted on the friction device varies.

In the configuration described above, when an elastic restoring force of the spring plate that exerts an axial pressure on the worm wheel against the friction plate and the housing wall is increased as described above, variations of the friction force generated in the friction device further increases. Accordingly, the maximum value of the friction force further increases.

The clutch driving device needs to have such a configuration that can generate a driving force capable of driving the clutch even when the friction force is at maximum. Thus, in the case where the maximum value of the friction force further increases as described above, to obtain the driving force capable of driving the clutch without an increase in output (size) of the clutch driving device, the clutch driving device needs to be configured to increase the driving force by, for example, increasing a speed-reducing rate of the transfer mechanism. When the speed-reducing rate of the transfer mechanism is increased in this manner, responsiveness of the transfer mechanism decreases.

As described above, in the clutch driving device having the self-lock function, it has been difficult to achieve both maintaining of the self-lock function and an increase in responsiveness of the transfer mechanism.

In this situation, the inventors of the present teaching assumed that reduction of variations of the friction force generated in the friction device can increase responsiveness of the transfer mechanism while maintaining the self-lock function of the clutch driving device. In view of this, the inventors conceived that prevention of transfer of a thrust force of the worm wheel to the friction device can reduce variations of the friction force generated in the friction device.

The inventors therefore found a configuration of a clutch driving device having a self-lock function in which a friction mechanism for achieving the self-lock function and a transfer mechanism for transferring rotation are separated from each other in order to transfer only a force in the rotation direction of the transfer mechanism to the friction mechanism.

Specifically, a clutch driving device according to one embodiment of present teaching is a clutch driving device including: a driving unit for driving a clutch and a transfer mechanism that transfers, to the clutch, a force in a rotation direction (rotation force) output from the driving unit. The clutch driving device includes: a friction mechanism that generates a friction force in a direction opposite to the rotation direction of rotation transferred by the transfer mechanism. The transfer mechanism includes an input shaft that receives a force in the rotation direction output from the driving unit, an output shaft that outputs, to the clutch, a force in the rotation direction transferred from the input shaft, and a transfer element that transfers a force in the rotation direction from the input shaft to the output shaft. The friction mechanism includes a rotation body that rotates about an axis by a force in the rotation direction transferred by the transfer mechanism, a friction force generating portion that generates a friction force by contact with the rotation body, and a biasing portion that biases one of the rotation body or the friction force generating portion relative to the other in an axial direction such that the rotation body and the friction force generating portion are brought into contact with each other, and the axial direction is a direction in which the axis extends. One of the input shaft, the output shaft, or the transfer element includes a rotation transfer portion that rotates together with the rotation body and is disposed to be movable in the axial direction relative to the rotation body.

With the configuration described above, the transfer mechanism that transfers a force in the rotation direction output from the driving unit and the friction mechanism that achieves the self-lock function can be separated from each other such that only the force in the rotation direction of the transfer mechanism is transferred to the friction mechanism. That is, the rotation transfer portion that transfers the force in the rotation direction of the transfer mechanism to the friction mechanism is disposed to be movable in the axial direction relative to the rotation body of the friction mechanism. Thus, even in a case where a force in the axial direction is generated on the shaft provided with the rotation transfer portion, transfer of a force in the axial direction to the friction mechanism can be prevented.

Accordingly, even when a tilt or the like occurs in the transfer mechanism, variations in a friction force between the rotation body and the friction plate of the friction mechanism due to the tilt can be reduced. Consequently, in the clutch driving device, it is possible to increase responsiveness in driving while maintaining the self-lock function.

In another aspect, the clutch driving device according to the present teaching preferably includes the following configurations. The clutch driving device further includes a casing housing the transfer mechanism and the friction mechanism, and the casing includes a first casing portion housing the transfer mechanism and a second casing portion housing the friction mechanism.

Accordingly, the transfer mechanism and the friction mechanism can be assembled separately. Consequently, precision in assembly of the clutch driving device can be enhanced, and workability in assembly can be increased. In addition, since the friction mechanism is disposed in the cover constituting a part of the casing, the friction mechanism can be easily positioned relative to the transfer mechanism disposed in the first casing portion.

In another aspect, the clutch driving device according to the present teaching preferably includes the following configurations. One of the input shaft, the output shaft, or the transfer element including the rotation transfer portion partially projects out of the first casing portion.

Accordingly, the friction mechanism can be easily positioned relative to the transfer mechanism. Consequently, assembly of the clutch driving device can be easily performed. In addition, since the friction mechanism is disposed closer to the transfer mechanism, variations of a friction force generated in the friction mechanism can be further reduced.

In another aspect, the clutch driving device according to the present teaching preferably includes the following configurations. The first casing portion has a cylindrical shape having a bottom, and the second casing portion is attached to the first casing portion to cover an opening of the first casing portion.

Accordingly, the second casing portion housing the friction mechanism can also serve as the cover of the first casing portion housing the transfer mechanism. Consequently, the clutch driving device can be made compact.

In another aspect, the clutch driving device according to the present teaching preferably includes the following configurations. The second casing portion includes a cover body that covers the opening of the first casing portion and includes a housing recess capable of housing at least a part of the friction mechanism, and a lid portion covering the housing recess.

Accordingly, at least a part of the friction mechanism is housed in the cover body including the housing recess, and thus, the clutch driving device can be made compact.

In another aspect, the clutch driving device according to the present teaching preferably includes the following configurations. The transfer element includes an intermediate shaft that transfers a force in the rotation direction from the input shaft to the output shaft, and the rotation transfer portion is disposed in the intermediate shaft.

This rotation transfer portion provided in the intermediate shaft where a thrust force is less likely to occur can further reduce variations of a friction force generated in the friction mechanism.

In another aspect, the clutch driving device according to the present teaching preferably includes the following configurations. The rotation body is located closer to the rotation transfer portion than the biasing portion.

Accordingly, the rotation body can be disposed closer to the transfer mechanism. Thus, rotation of the transfer mechanism can be more efficiently transferred to the rotation body through the rotation transfer portion.

In another aspect, the clutch driving device according to the present teaching preferably includes the following configurations. The rotation body has an opening portion at a rotation center of the rotation body, and the rotation transfer portion is located in the opening portion.

Accordingly, the rotation body is movable in the axial direction relative to the rotation transfer portion. Thus, even in a case where an axial force in the axial direction of the intermediate shaft is generated on the rotation transfer portion, transfer of the axial force to the friction mechanism can be prevented while the rotation transfer portion transfers rotation to the rotation body. Accordingly, even when a tilt or the like occurs in the transfer mechanism, variations in a friction force between the rotation body and the friction plate of the friction mechanism due to the tilt can be reduced.

In another aspect, the clutch driving device according to the present teaching preferably includes the following configurations. The friction mechanism is disposed such that the transfer mechanism is located between the friction mechanism and the driving unit in the axial direction.

Accordingly, the clutch driving device can be made compact.

In another aspect, the clutch driving device according to the present teaching preferably includes the following configurations. The transfer element includes a spur gear, and rotation of the input shaft is transferred to the output shaft through the spur gear.

Transfer of rotation of the input shaft to the output shaft through the spur gear suppresses generation of an axial force (thrust force), as compared to a worm gear. Thus, variations of a friction force generated in the friction mechanism can be further reduced.

In another aspect, the clutch driving device according to the present teaching preferably includes the following configurations. The clutch driving device includes an assist mechanism that applies, to the output shaft, a force in the rotation direction to assist operation of the clutch.

Accordingly, the sum of an axial torque exerted on the output shaft, that is, an axial torque exerted on the output shaft by driving of the driving unit and the assist mechanism, and an axial torque generated by a clutch reaction force of the clutch can be reduced in a wide range of the actuator rotation angle, as compared to a case where the assist mechanism is not provided. This configuration further ensures the self-lock function obtained by the friction mechanism and can increase responsiveness in driving of the clutch driving device.

A vehicle according to one embodiment of the present teaching includes a clutch driving device including any one of the configurations described above.

The terminology used herein is for the purpose of describing particular embodiments only and is not intended to be limiting to the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Embodiments of a clutch driving device and a vehicle according to present teaching are discussed herein.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Advantageous Effects of Invention

A clutch driving device according to one embodiment of the present teaching can increase responsiveness of a transfer mechanism while maintaining a self-lock function.

BRIEF DESCRIPTION OF THE DRAWINGS

FIG. 8 is a graph schematically showing an example of relationship between an actuator rotation angle and a shaft torque.

FIG. 9 is a view of an engine, the clutch, and the clutch driving device when seen from above the vehicle.

DETAILED DESCRIPTION

Figure 1:
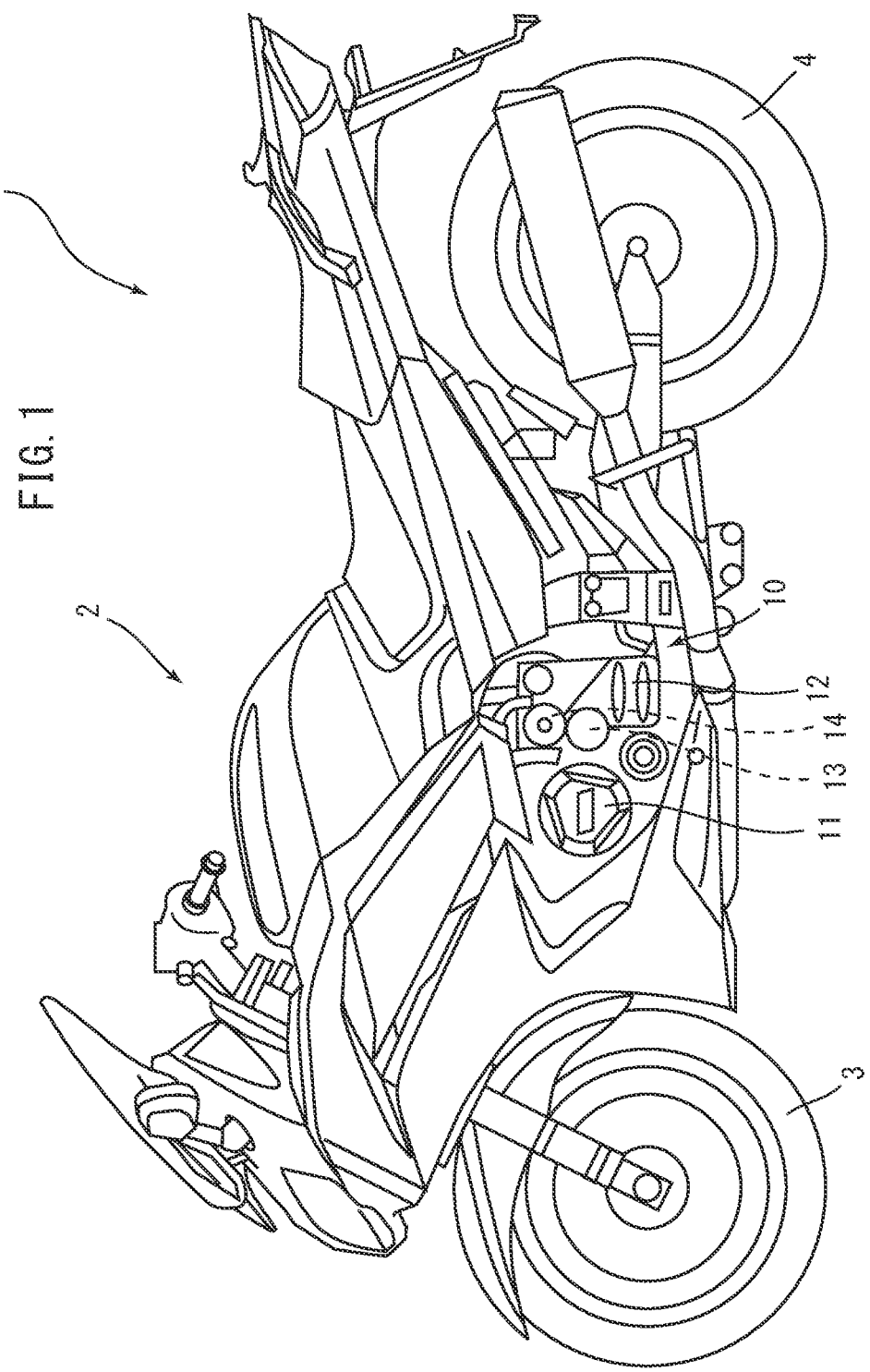
FIG. 1 is a side view of a vehicle including a clutch driving device according to an embodiment of the present teaching.

Embodiments of the present teaching will be described hereinafter with reference to the drawings. The dimensions of components in the drawings do not strictly represent actual dimensions of the components and dimensional proportions of the components.

Overall Configuration

FIG. 1 is a schematic view of a vehicle 1 including a clutch driving device 14 according to a first embodiment of the present teaching. The vehicle 1 is, for example, a motorcycle and includes a vehicle body 2, a front wheel 3, and a rear wheel 4. The vehicle body 2 includes an unillustrated frame. An engine unit 10 for supplying a rotation driving force to the rear wheel 4 is attached to the frame of the vehicle body 2.

The engine unit 10 includes an engine 11, a transmission 12, a clutch 13, and a clutch driving device 14. The clutch 13 is configured to enable transfer of rotation of an unillustrated crank shaft of the engine 11 to the transmission 12. That is, the clutch 13 is configured to be switchable between transfer and non-transfer of rotation of the crank shaft to the transmission 12.

Figure 2:
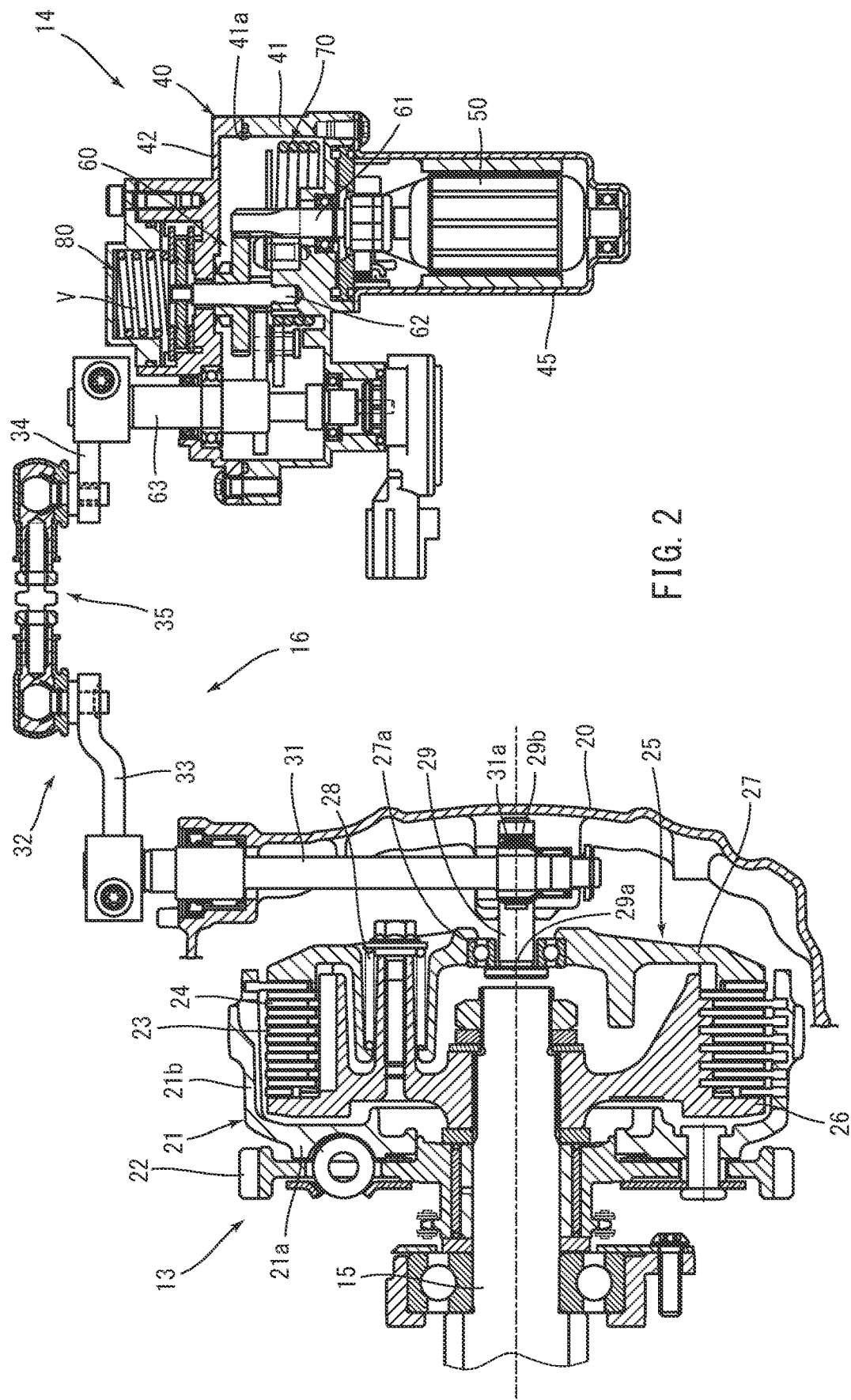
FIG. 2 is a partial cross-sectional view illustrating a schematic configuration of a clutch driving device and a clutch.

FIG. 2 is a partial cross-sectional view illustrating a schematic configuration of the clutch 13 and the clutch driving device 14. As illustrated in FIG. 2, the clutch 13 is disposed on a main shaft 15. The main shaft 15 is, for example, an input shaft of the transmission 12. The clutch 13 includes a clutch housing 21 and a clutch inner 25 disposed inside the clutch housing 21.

The clutch housing 21 has a cylindrical shape having a bottom including a bottom portion 21a through which the main shaft 15 penetrates and a cylindrical peripheral wall portion 21b disposed at the outer periphery of the bottom portion 21a. The bottom portion 21a and the peripheral wall portion 21b are integrally formed. The clutch housing 21 is disposed coaxially with the main shaft 15. A part of the clutch inner 25 is disposed inside the peripheral wall portion 21b of the clutch housing 21.

The bottom portion 21a of the clutch housing 21 is connected to a speed-reducing gear 22. The speed-reducing gear 22 is meshed with a gear (not shown) of the crank shaft to thereby rotate together with the gear. The clutch housing 21 and the speed-reducing gear 22 rotate in accordance with rotation of the crank shaft, and are capable of rotating relative to the main shaft 15.

The clutch inner 25 includes a clutch boss 26, a pressure member 27, and a clutch spring 28. The clutch boss 26 has a columnar shape, and the main shaft 15 penetrates the center of the columnar shape. The clutch boss 26 is spline-coupled to the outer peripheral surface of the main shaft 15. Accordingly, the clutch boss 26 rotates together with the main shaft 15.

The clutch housing 21, the clutch boss 26, and the pressure member 27 are arranged in this order relative to the main shaft 15 along the axial direction of the main shaft 15 from one end thereof. The pressure member 27 is disposed outside the main shaft 15 in the axial direction to face the clutch boss 26 in the axial direction of the main shaft 15. A plurality of clutch plates 23 and a plurality of friction plates 24 are alternately arranged in the axial direction between the clutch boss 26 and the pressure member 27.

The friction plates 24 are provided to the inner peripheral surface of the clutch housing 21 to be rotatable together with the clutch housing 21. The friction plates 24 are rotatable with respect to the clutch boss 26 and the pressure member 27.

The clutch plates 23 are provided to the outer peripheral surface of the clutch boss 26 to be rotatable together with the clutch boss 26. The pressure member 27 is rotatable together with the clutch boss 26. Accordingly, the clutch plates 23 are rotatable together with the pressure member 27. The clutch plates 23 are rotatable with respect to the clutch housing 21.

The pressure member 27 is movable in the axial direction with respect to the clutch boss 26. The clutch spring 28 is disposed to push the pressure member 27 toward the clutch boss 26 in the axial direction. Accordingly, the clutch plates 23 and the friction plates 24 disposed between the clutch boss 26 and the pressure member 27 are pushed against with each other. Friction between the clutch plates 23 and the friction plates 24 causes the clutch boss 26 and the clutch housing 21 to rotate together. This state is an engaged state of the clutch 13.

A push rod 29 penetrates a center portion in the axial direction of the pressure member 27 when seen in the axial direction. The push rod 29 is oriented to extend in the axial direction. An end in the axial direction of push rod 29 is provided with a flange portion 29a. The other end of the push rod 29 in the axial direction is connected to the clutch driving device 14 through a link mechanism 16 described later. The push rod 29 is configured to be movable in the axial direction by an output of the clutch driving device 14. In a case where the push rod 29 moves in a direction away from the main shaft 15 (rightward in FIG. 2) in the axial direction, the flange portion 29a of the push rod 29 exerts a force on the pressure member 27 in a direction away from the clutch boss 26 in the axial direction. Accordingly, the clutch spring 28 deforms to be compressed so that a force with which the pressure member 27 presses the clutch plates 23 and the friction plates 24 decreases.

Consequently, a contact pressure between the friction plates 24 and the clutch plates 23 decreases. As a result, engagement between the friction plates 24 and the clutch plates 23 is canceled, and the clutch boss 26 and the clutch housing 21 rotate relative to each other. This state is a disengaged state of the clutch 13.

That is, the clutch 13 is switched between the engaged state and the disengaged state by movement of the push rod 29 in the axial direction.

The pressure member 27 is rotatable with respect to the push rod 29 with a bearing 27a interposed therebetween. Accordingly, in the engaged state of the clutch 13, the pressure member 27 rotates together with the clutch housing 21 and the clutch boss 26.

The link mechanism 16 includes a rotating shaft 31 and an arm portion 32. The link mechanism 16 transfers an output of the clutch driving device 14 described later to the push rod 29 of the clutch 13.

One end of the rotating shaft 31 in the axial direction is connected to the other end of the push rod 29 in the axial direction. Specifically, this other end of the push rod 29 in the axial direction is provided with a rack portion 29b having a plurality of teeth arranged in the axial direction. The rotating shaft 31 has a gear 31a that meshes with the rack portion 29b.

With the foregoing configuration, rotation of the rotating shaft 31 causes the push rod 29 to move in the axial direction. That is, the push rod 29 reciprocates in the axial direction in accordance with the rotation direction of the rotating shaft 31.

The rotating shaft 31 is rotatably supported on a casing 20 housing the clutch 13 and the transmission 12, for example.

The arm portion 32 includes a first arm 33, a second arm 34, and an adjustment mechanism 35. Each of the first arm 33 and the second arm 34 is formed in a plate shape elongated in one direction. The first arm 33 is connected to the rotating shaft 31 to be rotatable together with the rotating shaft 31. The second arm 34 is connected to the output shaft 63 of the clutch driving device 14 to be rotatable together with the output shaft 63. The adjustment mechanism 35 connects the first arm 33 and the second arm 34 to each other such that the distance between the first arm 33 and the second arm 34 can be adjusted.

The arm portion 32 transfers rotation of the output shaft 63 of the clutch driving device 14 to the rotating shaft 31. The arm portion 32 transfers a driving force output from the output shaft 63 of the clutch driving device 14 to the clutch 13, and transfers a reaction force generated by, for example, the clutch spring 28 in the clutch 13 (hereinafter referred to as a clutch reaction force) to the output shaft 63 of the clutch driving device 14. That is, the output shaft 63 receives an output of the clutch driving device 14 and a clutch reaction force generated in the clutch 13.

Configuration of Clutch Driving Device

A configuration of the clutch driving device 14 will now be described with reference to FIGS. 2 through 10. The clutch driving device 14 according to this embodiment outputs, to the clutch 13, a driving force obtained by adding an assist force of an assist mechanism 70 to an output of the motor 50 (driving unit).

Figure 3:
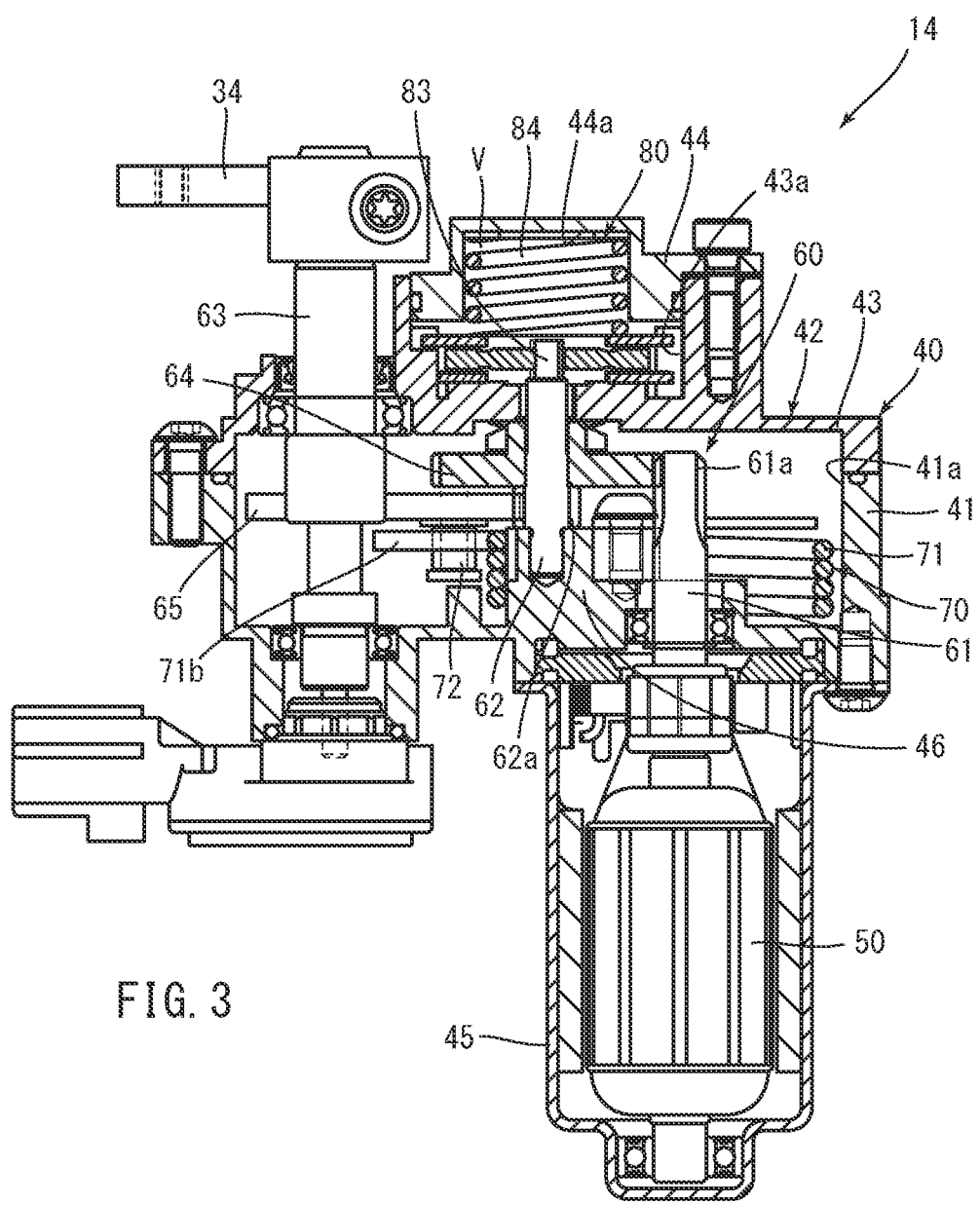
FIG. 3 is a partial cross-sectional view illustrating the clutch driving device in an enlarged manner.

FIG. 3 illustrates a schematic configuration of the clutch driving device 14 in an enlarged manner. As illustrated in FIGS. 2 and 3, the clutch driving device 14 includes the casing 40, the motor 50, a transfer mechanism 60, the assist mechanism 70, and a friction mechanism 80.

Figure 4:
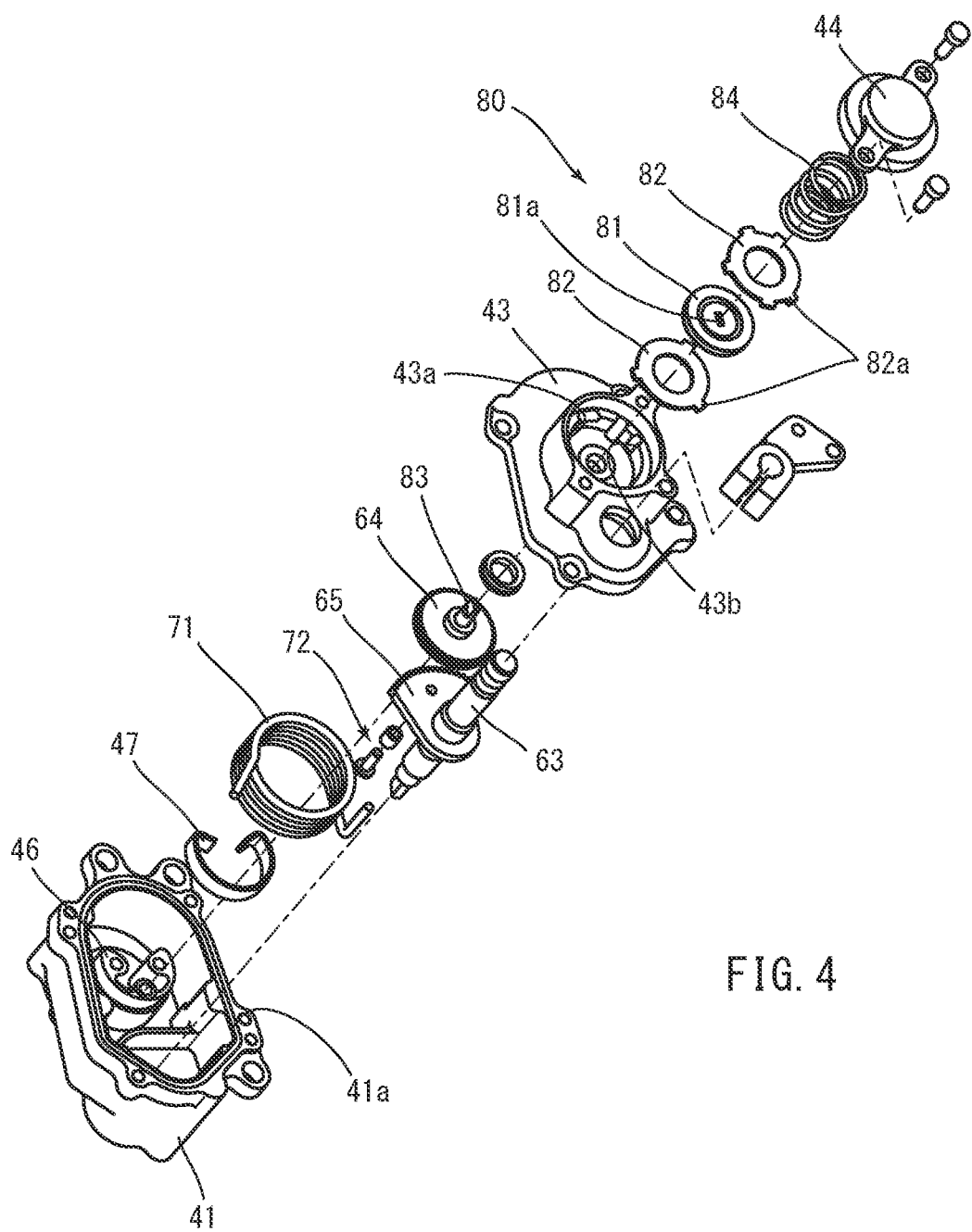
FIG. 4 is a disassembled perspective view of an assist mechanism and a friction mechanism in the clutch driving device.

The casing 40 includes a casing body 41 (first casing portion), a cover 42 (second casing portion), and a motor compartment 45. FIG. 4 is a disassembled perspective view illustrating a part of the clutch driving device 14 in a disassembled state. As illustrated in FIG. 4, the casing body 41 has a cylindrical shape having a bottom extending in a cylinder axial direction. That is, the casing body 41 has an opening 41a. As illustrated in FIGS. 2 and 3, the casing body 41 accommodates the transfer mechanism 60 and the assist mechanism 70. As illustrated in FIG. 4, a protrusion 46 is integrally formed on the bottom of the casing body 41.

As illustrated in FIG. 3, the cover 42 covers the opening 41a of the casing body 41. The cover 42 has storage space V therein. The friction mechanism 80 is disposed in the storage space V. The cover 42 includes a cover body 43 and a storage cover portion 44 (lid portion). The cover body 43 has a first recess 43a (housing recess) constituting a part of the storage space V. The storage cover portion 44 has a second recess 44a constituting the storage space V. The first recess 43a and the second recess 44a constitute the storage space V with the cover body 43 combined with the storage cover portion 44.

The output shaft 63 of the transfer mechanism 60 described later penetrates a portion of the cover 42 different from the portion where the storage space V is formed. The output shaft 63 extends in the cylinder axial direction of the casing body 41 and outward of the casing 40. That is, the axial direction of the output shaft 63 coincides with the cylinder axial direction of the casing body 41.

As illustrated in FIGS. 2 and 3, the motor compartment 45 is connected to the bottom of the casing body 41. Specifically, the motor compartment 45 is attached to the casing body 41 at a position that does not overlap the output shaft 63 when seen in the axial direction of the output shaft 63. The motor 50 is disposed in the motor compartment 45 such that an unillustrated rotating shaft extends along the axial direction.

The transfer mechanism 60 includes an input shaft 61, an intermediate shaft 62 (transfer element), and the output shaft 63. The input shaft 61, the intermediate shaft 62, and the output shaft 63 are disposed in parallel. The input shaft 61 is an output shaft of the motor 50. Thus, the intermediate shaft 62 and the output shaft 63 are disposed in parallel with the output shaft of the motor 50. That is, the input shaft 61 (output shaft of the motor) and the intermediate shaft 62 extend along the axial direction of the output shaft 63.

One end of the input shaft 61 in the axial direction is located in the motor compartment 45 housing the motor 50. The other end of the input shaft 61 in the axial direction is located in space defined by the casing body 41 and the cover 42. The other end of the input shaft 61 in the axial direction is provided with a gear 61a having a plurality of teeth arranged in the circumferential direction. In this embodiment, the gear 61a is a spur gear.

One end of the intermediate shaft 62 in the axial direction is rotatably supported on the casing body 41. An intermediate gear 64, which is a spur gear, is provided to the intermediate shaft 62 to be rotatable together with the intermediate shaft 62. The intermediate gear 64 meshes with the gear 61a of the input shaft 61. Accordingly, rotation of the input shaft 61 is transferred to the intermediate shaft 62 through the intermediate gear 64. That is, the intermediate shaft 62 rotates in accordance with rotation of the input shaft 61.

The intermediate shaft 62 is provided with a gear 62a having a plurality of teeth arranged in the circumferential direction at a position closer to a center in the axial direction than the one end of the intermediate shaft 62 rotatably supported on the casing body 41. In this embodiment, the gear 62a is a spur gear closer to one side in the axial direction of the intermediate shaft 62 than the intermediate gear 64 is.

The other end of the intermediate shaft 62 in the axial direction is rotatably supported on the cover 42. This other end of the intermediate shaft 62 in the axial direction is provided with a rotation transfer portion 83 of the friction mechanism 80 described later. Specifically, the other end of the intermediate shaft 62 in the axial direction is provided with the rotation transfer portion 83 having a rectangular shape in cross section (see FIG. 12). A part of the intermediate shaft 62 including the rotation transfer portion 83 (the other end of the intermediate shaft 62 in the axial direction) projects outward of the casing body 41. The rotation transfer portion 83 is inserted in a through hole 81a of a rotation body 81 of the friction mechanism 80 described later (see FIGS. 11 and 12). As described above, by projecting the part of the intermediate shaft 62 including the rotation transfer portion 83 outward of the casing body 41, the friction mechanism 80 can be easily positioned in assembling the friction mechanism 80 to the intermediate shaft 62. Thus, assembly of the clutch driving device 14 can be performed easily. In a case where a torque in the rotation direction exerted on the intermediate shaft 62 is less than or equal to a predetermined value (e.g., a case where an output of the motor 50 is stopped), the friction mechanism 80 reduces rotation of the intermediate shaft 62 by a friction force.

As illustrated in FIG. 3, one end of the output shaft 63 in the axial direction is rotatably supported on the casing body 41, and a center portion of the output shaft 63 in the axial direction is rotatably supported on the cover 42. The other end of the output shaft 63 in the axial direction projects outward of the cover 42. This other end of the output shaft 63 in the axial direction is connected to the second arm 34 of the link mechanism 16 to be rotatable together with the second arm 34. Accordingly, rotation of the output shaft 63 is transferred to the clutch 13 through the link mechanism 16, and a clutch reaction force generated in the clutch 13 is input to the output shaft 63 through the link mechanism 16.

An output gear 65 having a sector shape in plan view is provided to the output shaft 63 to be rotatable together with the output shaft 63. The output gear 65 is a spur gear and meshes with the gear 62a of the intermediate shaft 62. Accordingly, rotation of the intermediate shaft 62 is transferred to the output shaft 63 through the output gear 65. That is, the output shaft 63 rotates in accordance with rotation of the intermediate shaft 62.

As described above, the output shaft 63 receives rotation of the intermediate shaft 62 of the clutch driving device 14 and also receives the clutch reaction force generated in the clutch 13.

An end of the output gear 65 in the thickness direction is provided with a columnar pin 72 projecting in the thickness direction. That is, the pin 72 extends in the axial direction of the output shaft 63. In this embodiment, as illustrated in FIGS. 2 and 3, the pin 72 is provided on one of the surfaces of the output gear 65 in the thickness direction at one side of the output shaft 63 in the axial direction. That is, the pin 72 is provided on the output gear 65 such that the pin 72 extends toward the bottom of the casing body 41 with the output shaft 63 and the output gear 65 disposed in the casing 40. Thus, the pin 72 rotates about the output shaft 63 with rotation of the output gear 65 that rotates together with the output shaft 63. The pin 72 contacts a first projection 71b of a spring 71 of the assist mechanism 70 described later. The pin 72 is rotatable with respect to the output gear 65. Thus, when the pin 72 moves while contacting the first projection 71b of the spring 71 as described later, the pin 72 moves relative to the first projection 71b while rotating.

The assist mechanism 70 includes the spring 71 and the pin 72 described above. The spring 71 includes a wire material extending helically about an axis. The spring 71 has a cylindrical shape extending in the axial direction. The spring 71 is a so-called torsion spring that generates an elastic restoring force in a circumferential direction by twisting one end of the wire material relative to the other end of the wire material in the circumferential direction. In this embodiment, the wire material for the spring 71 is wound clockwise from a winding start end (first projection 71b) that is one end of the wire material, as illustrated in FIG. 5.

The spring 71 is disposed in the casing body 41 to surround the input shaft 61 and the intermediate shaft 62 when seen in the axial direction of the output shaft 63. The input shaft 61 is inserted in the spring 71. One end of the intermediate shaft 62 in the axial direction is rotatably supported on a part of the casing body 41 (projection 46 described later) located inside the spring 71. The axis of the spring 71 is oriented in parallel with the output shaft 63. One end of the wire material constituting the spring 71 extends toward the output shaft 63.

Figure 5:
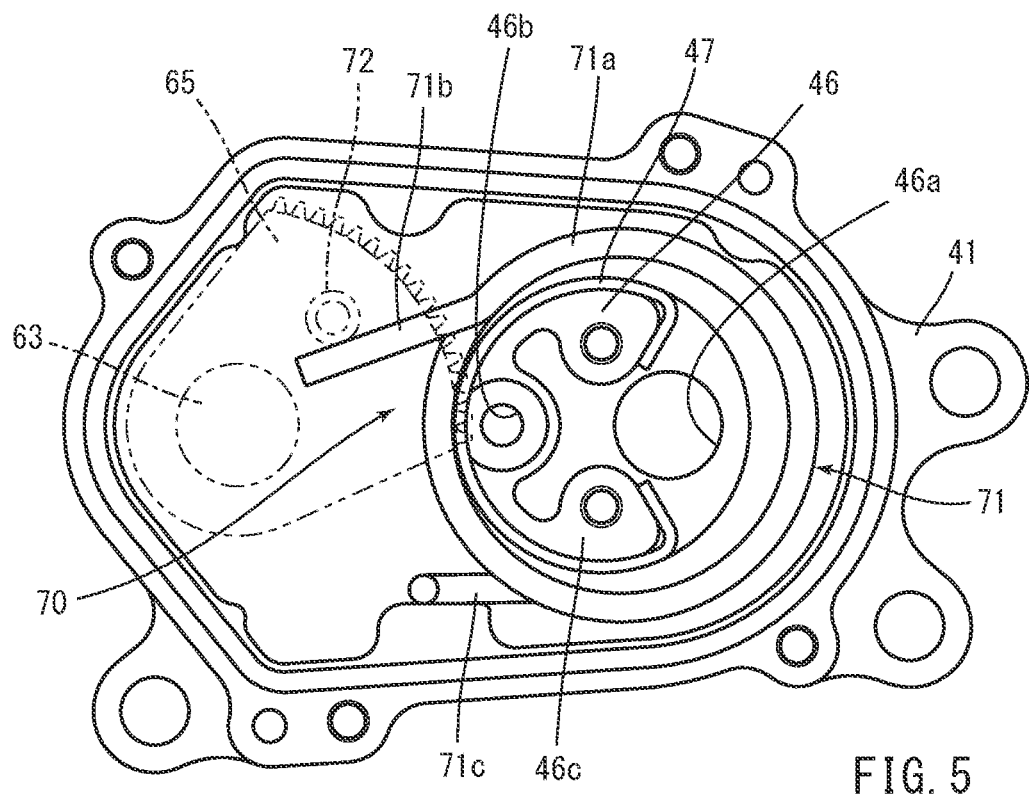
FIG. 5 is a view of the assist mechanism when seen in an axial direction of an output shaft.

FIG. 5 is a view of a schematic configuration of the assist mechanism 70 when seen in the axial direction of the output shaft 63. As illustrated in in FIG. 5, the columnar projection 46 disposed on the inner surface of the casing body 41 is located inside the spring 71. The protrusion 46 has an outer diameter smaller than the inner diameter of the spring 71. The protrusion 46 has a through opening 46a in which the input shaft 61 is inserted and an opening portion 46b in which one end of the intermediate shaft 62 in the axial direction is inserted.

The spring 71 contacts a portion of the protrusion 46 close to the output shaft 63. A circumferential part of the protrusion 46 including the portion contacting with the spring 71 is provided with a metal contact plate 47 having an arc shape when seen in the axial direction of the output shaft 63. Both ends of the contact plate 47 are fixed to the projection 46c of the protrusion 46. The spring 71 contacts the contact plate 47. The contact plate 47 provided on the protrusion 46 can reduce damage of the protrusion 46 by the spring 71 when the spring 71 operates as described later.

One end of the wire material constituting the spring 71 extends toward the output shaft 63 as described above. That is, one end of the wire material extends radially outward of the spring 71. The other end of the wire material of the spring 71 also extends radially outward of the spring 71. That is, the spring 71 includes a cylindrical coil portion 71a, a first projection 71b including one end of the wire material and extending radially outward from the coil portion 71a, and a second projection 71c including the other end of the wire material and extending radially outward from the coil portion 71a. In this embodiment, the first projection 71b and the second projection 71c extend toward the output shaft 63 when seen in the axial direction of the output shaft 63.

Figure 6:
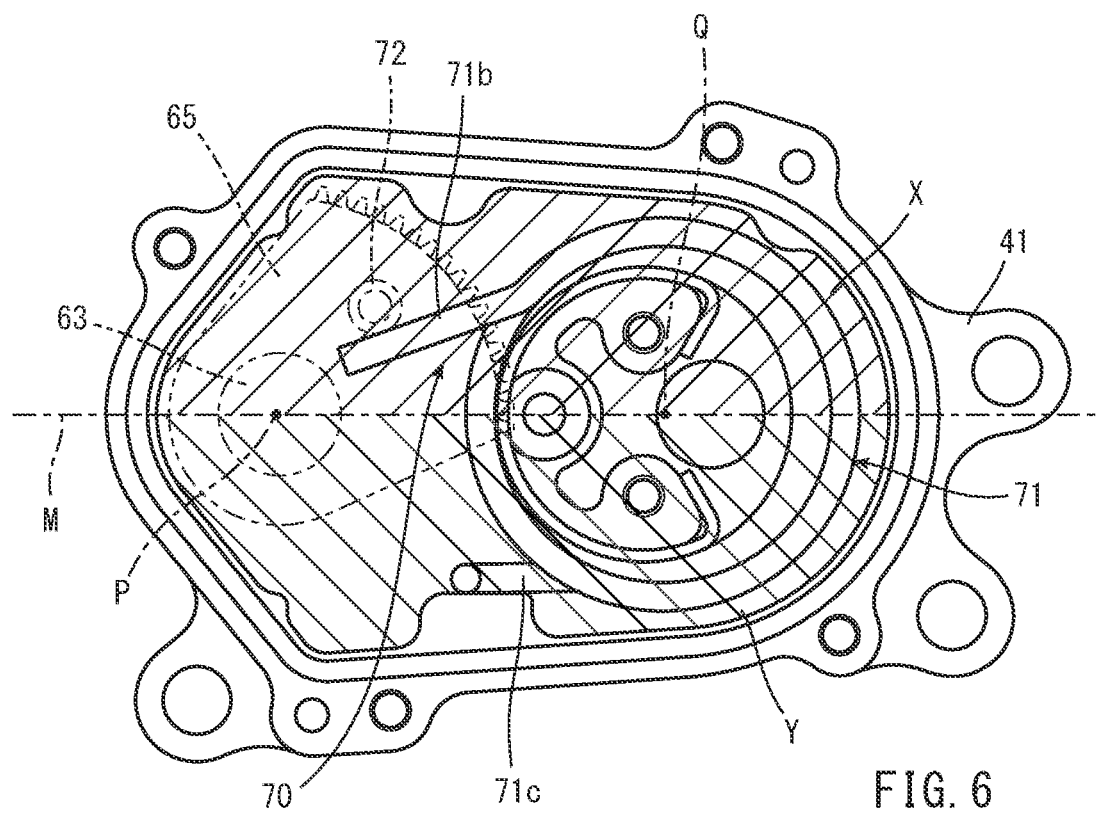
FIG. 6 illustrates regions X and Y in the assist mechanism and corresponds to FIG. 5.

The first projection 71b contacts the pin 72 provided on the output gear 65 of the output shaft 63. The second projection 71c contacts the inner surface of the casing body 41. As illustrated in FIG. 6, supposing internal space of the casing body 41 is divided into two regions X and Y by an imaginary line M connecting the shaft center P of the output shaft 63 and a center Q (axis) of the spring 71 when seen in the axial direction of the output shaft 63 with the output gear 65 located at a position of a clutch disengaged state as described later, the first projection 71b and the second projection 71c are located in different regions in the two regions X and Y. That is, as illustrated in FIG. 6, in the state where the output gear 65 is located at a position of the clutch disengaged state, the first projection 71b of the spring 71 is located in the region X, whereas the second projection 71c is located in the region Y. FIG. 6 is a schematic view corresponding to FIG. 5 and hatching the regions X and Y for description.

Accordingly, in the spring 71, in a case where one end of the wire material in the first projection 71b rotates in the circumferential direction of the spring 71 with the second projection 71c being in contact with the inner surface of the casing body 41, an elastic restoring force is generated in a direction in which the first projection 71b moves away from the second projection 71c. That is, in a case where the pin 72 rotates around the axis of the output shaft 63 with rotation of the output shaft 63, the first projection 71b of the spring 71 is pushed by the pin 72 in the circumferential direction of the spring 71. Accordingly, one end of the wire material of the spring 71 rotates about the axis of the spring 71 to approach the other end of the wire material in the second projection 71c. Such deformation of the spring 71 generates an elastic restoring force in the spring 71 in the circumferential direction of the spring 71 in a way in which the first projection 71b moves away from the second projection 71c.

Figure 7A:
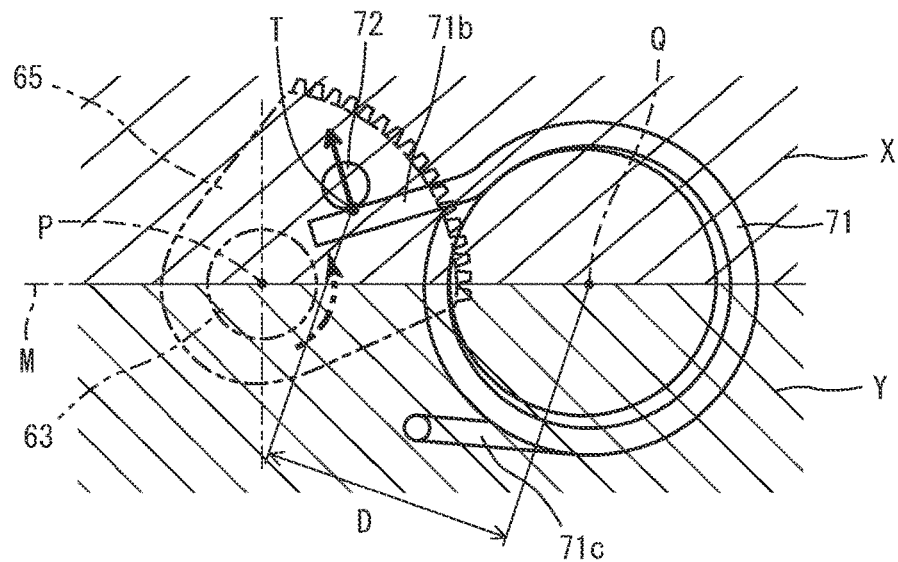
FIG. 7A is schematically illustrates an example of operation of the assist mechanism.
Figure 7B:
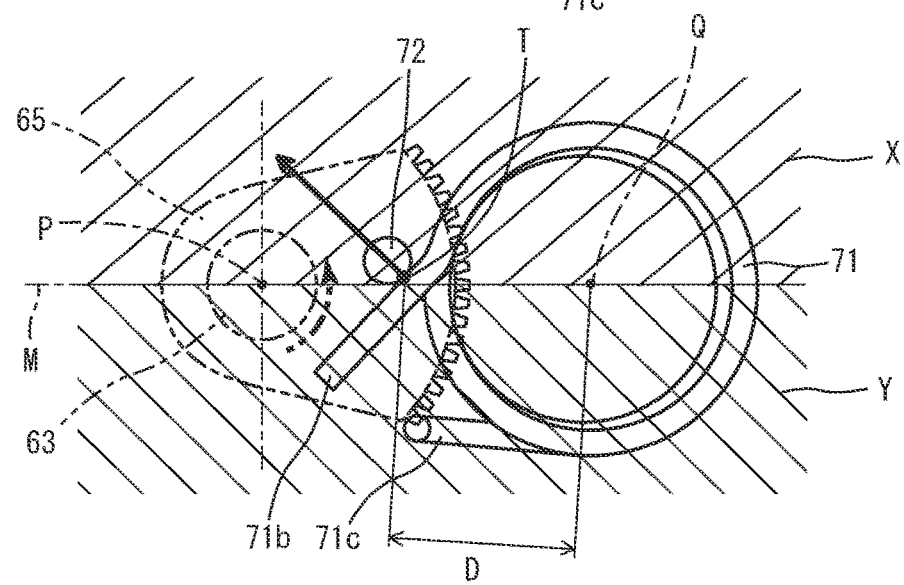
FIG. 7B is schematically illustrates an example of operation of the assist mechanism.
Figure 7C:
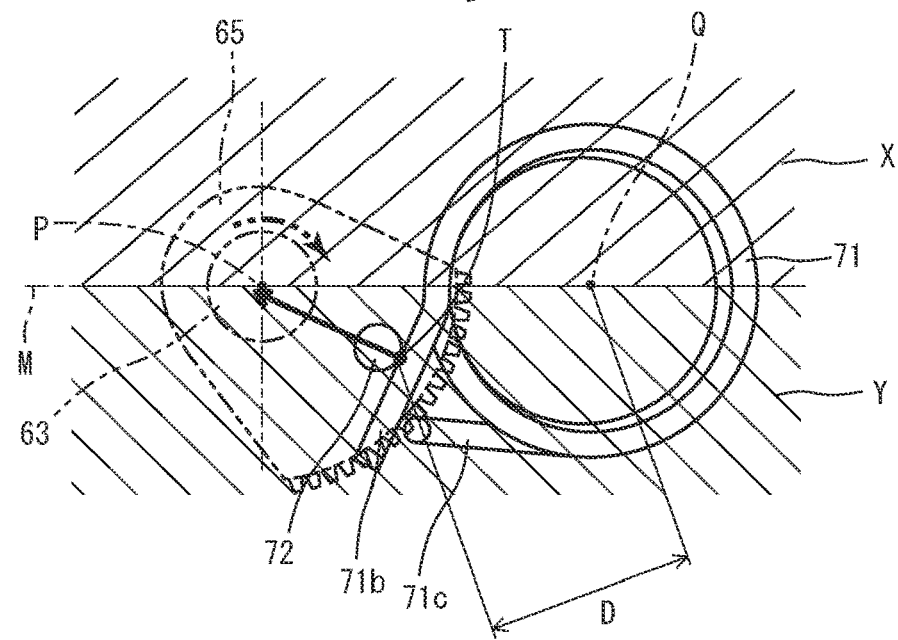
FIG. 7C is schematically illustrates an example of operation of the assist mechanism.

FIGS. 7A, 7B, and 7C show schematic views illustrating relationship between the rotation position of the output gear 65 and deformation of the spring 71. In these views, the output shaft 63 and the output gear 65 are represented by dot-dot-dash lines, and only the pin 72 and the spring 71 are represented by continuous lines, for description. In these views, the regions X and Y are hatched for description, in a manner similar to FIG. 6. FIGS. 7A, 7B, and 7C schematically illustrate regions X and Y defined by the imaginary line M for simplifying the drawings.

As illustrated in FIGS. 7A, B, and C, in a case where the pin 72 rotates about the axis of the output shaft 63 with rotation of the output gear 65, one end of the wire material of the spring 71 contacting the pin 72 is displaced in the circumferential direction of the spring 71 relative to the other end of the wire material. In this case, a contact point T between the pin 72 and the first projection 71b including one end of the wire material of the spring 71 reciprocates with respect to the first projection 71b along the first projection 71b.

FIG. 7A illustrates a rotation position of the output gear 65 when the clutch 13 is in the disengaged state. FIG. 7B illustrates a rotation position of the output gear 65 when the clutch 13 is in a half-clutch state (a state where sliding occurs between the clutch plates 23 and the friction plates 24 but a force in the rotation direction is transferred). FIG. 7C is a rotation position of the output gear 65 when the clutch 13 is in the engaged state.

Specifically, in a case where the output gear 65 is at the rotation position illustrated in FIG. 7A when seen in the axial direction of the output shaft 63, that is, in a case where the pin 72 provided on the output gear 65 is located in the region X in the two regions X and Y obtained by dividing the internal space of the casing body 41 into two by the imaginary line M connecting the shaft center P of the output shaft 63 and the center Q of the spring 71, the pin 72 is in contact with the first projection 71b of the spring 71 in a portion close to the front end.

Accordingly, as illustrated in FIG. 7A, a force exerted on the pin 72 by an elastic restoring force of the spring 71 is a force that causes the output gear 65 to rotate in a predetermined direction (also referred to as a rotation direction for clutch disengagement: a rotation direction indicated by an arrow of a dot-dot-dash line in FIG. 7A) such that the clutch 13 is disengaged. That is, the spring 71 applies a torque to the output gear 65 through the pin 72 in the rotation direction for clutch disengagement.

In the case of FIG. 7A, the first projection 71b of the spring 71 is not significantly displaced by the pin 72 in the circumferential direction of the spring 71. Thus, a force exerted on the pin 72 by the elastic restoring force of the spring 71 is smaller than those in the case of FIGS. 7B and 7C described later. For example, the pin 72 receives a force in a direction with a magnitude indicated by a solid arrow in FIG. 7A from the first projection 71b of the spring 71.

In a case where the output gear 65 is at the rotation position illustrated in FIG. 7B, that is, a case where the pin 72 moves closer to the imaginary line M than the position illustrated in FIG. 7A, the first projection 71b of the spring 71 is displaced such that one end of the wire material is located in the region Y, that is, one end of the wire material in the first projection 71b approaches the other end of the wire material in the second projection 71c. For example, in a case where the output gear 65 changes from the position illustrated in FIG. 7A to the position illustrated in FIG. 7B, the pin 72 approaches the coil portion 71a while contacting the first projection 71b of the spring 71.

Accordingly, the spring 71 is twisted in the circumferential direction. Consequently, the spring 71 generates an elastic restoring force in a direction in which the first projection 71b moves away from the second projection 71c. The elastic restoring force of the spring 71 is exerted on the pin 72 as indicated by the solid arrow in FIG. 7B. That is, the elastic restoring force of the spring 71 is transferred to the output gear 65 through the pin 72 as a torque in the rotation direction for clutch disengagement (the rotation direction indicated by the dot-dot-dash arrow in FIG. 7B). Accordingly, a force of assisting in the rotation direction for clutch disengagement is transferred from the spring 71 to the output gear 65 through the pin 72. At this time, a force exerted on the pin 72 from the first projection 71b of the spring 71 is larger than that in the case of FIG. 7A.

In a case where the output gear 65 is located at a rotation position illustrated in FIG. 7C, that is, in a case where the pin 72 is located in the region Y in the two regions X and Y, the first projection 71b of the spring 71 is displaced by the pin 72 to further approach the other end of the wire material in the second projection 71c. At this time, the pin 72 is located at a position closer to one end of the wire material than the position illustrated in FIG. 7B relative to the first projection 71b of the spring 71.

Accordingly, the spring 71 is further twisted in the circumferential direction. An elastic restoring force of the spring 71 is exerted on the pin 72 as indicated by the solid arrow in FIG. 7C. That is, the elastic restoring force of the spring 71 is exerted on the output gear 65 through the pin 72 in a direction in which the output gear 65 rotates to engage the clutch 13 (hereinafter referred to as a rotation direction for clutch engagement). Accordingly, a force of assisting in the rotation direction for clutch engagement is transferred from the spring 71 to the output gear 65 through the pin 72.

The contact point T between the pin 72 and the first projection 71b of the spring 71 straddles the imaginary line M connecting the shaft center P of the output shaft 63 and the center Q of the spring 71 when seen in the axial direction of the output shaft 63, in accordance with rotation of the output gear 65. A distance D between the contact point T and the center Q of the spring 71 varies in accordance with rotation of the output gear 65. That is, when seen in the axial direction of the output shaft 63, the distance D is smallest when the contact point T straddles the imaginary line M and increases as the distance to the contact point T from the imaginary line M increases.

FIG. 8 shows relationships between a rotation angle (actuator rotation angle) of the output gear 65 and shaft torques: a torque in a rotation direction in which the torque is exerted on the output shaft 63 by a load in operating the clutch 13 (clutch load) (hereinafter referred to as a shaft torque); a shaft torque exerted on the output shaft 63 by an assist force of the assist mechanism 70; and the sum of a shaft torque generated on the output shaft 63 by a clutch load (clutch reaction force) and a shaft torque generated on the output shaft 63 by an assist force. In FIG. 8, the actuator rotation angle refers to a rotation angle of the output gear 65 with respect to an initial rotation position (the position illustrated in in FIG. 7C) when seen in the axial direction of the output shaft 63 in a case where the output gear 65 rotates counterclockwise from the initial rotation position. A rotation range of the output gear 65 is defined by the inner surface of the casing body 41. That is, a position at which the output gear 65 contacts the inner surface of the casing body 41 when the output gear 65 rotates in the rotation direction for clutch engagement is a limit rotation position of the output gear 65 in the rotation direction for clutch engagement. A position at which the output gear 65 contacts the inner surface of the casing body 41 when the output gear 65 rotates in the rotation direction for clutch disengagement is a limit rotation position of the output gear 65 in the rotation direction for clutch disengagement.

In the case of this embodiment, the actuator rotation angle increases in a case where the output gear 65 rotates in the order from FIG. 7C, FIG. 7B, and FIG. 7A when seen in the axial direction of the output shaft 63.

The clutch load is equal to a reaction force (clutch reaction force) exerted on the clutch driving device 14 from the clutch spring 28 of the clutch 13, for example, while the clutch 13 operates.

The clutch reaction force increases with an increase in the actuator rotation angle when the clutch 13 switches from the engaged state to the disengaged state. On the other hand, a shaft torque exerted on the output shaft 63 by the clutch reaction force varies to be at maximum at a predetermined actuator rotation angle as indicated by the chain line in FIG. 8, depending on a lever ratio determined based on relationship in the position and length between the first arm 33 and the second arm 34 in the link mechanism 16.

Figure 10:
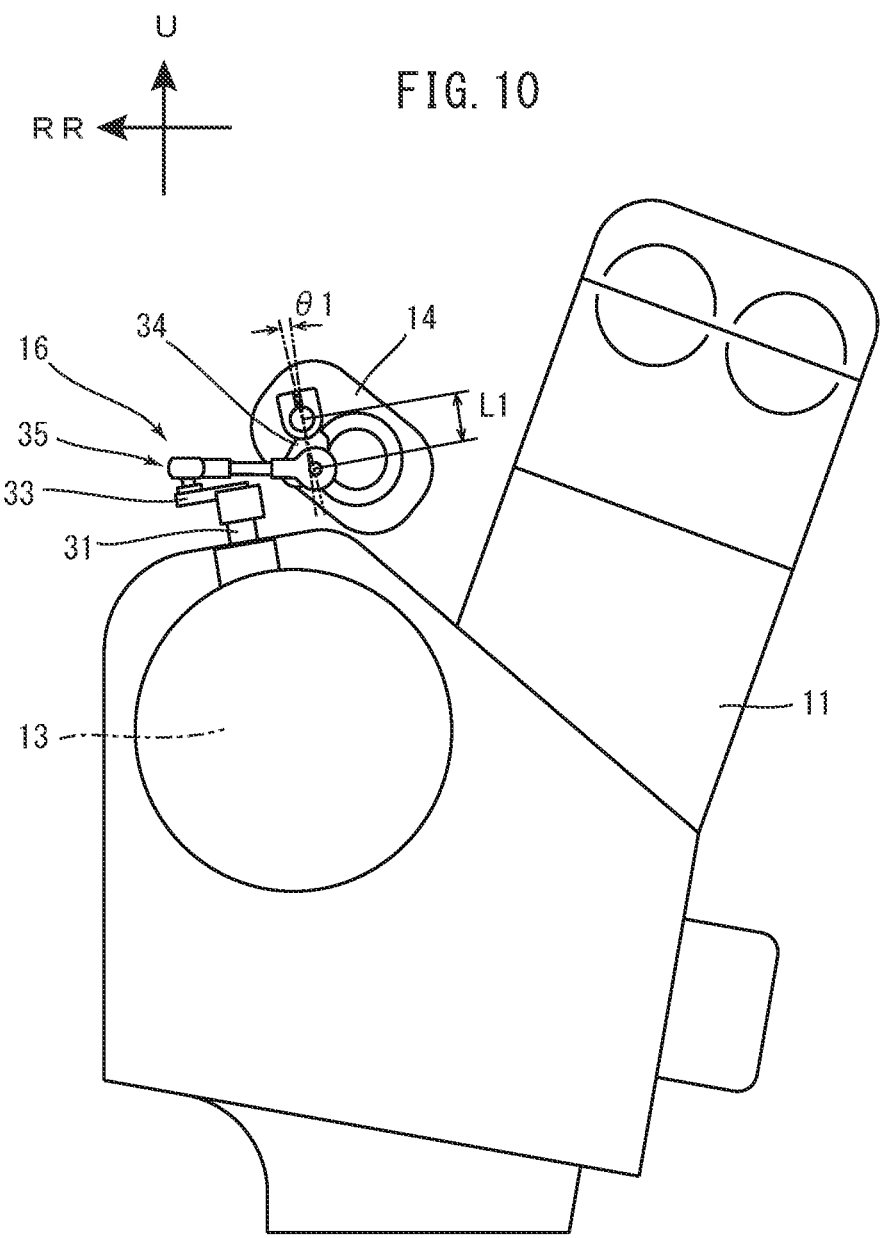
FIG. 10 is a view of the engine, the clutch, and the clutch driving device when seen from a side of the vehicle.

The lever ratio will be described below. The lever ratio refers to a ratio between a shaft torque exerted on the output shaft 63 of the clutch driving device 14 and a shaft torque exerted on the rotating shaft 31. In this embodiment, the clutch driving device 14 is disposed relative to the engine 11 and the clutch 13 as illustrated in FIGS. 9 and 10. FIG. 9 is a view schematically illustrating the engine 11, the clutch 13, and the clutch driving device 14 when seen from above the vehicle 1. FIG. 10 is a view schematically illustrating the engine 11, the clutch 13, and the clutch driving device 14 when seen from a side of the vehicle 1. In FIGS. 9 and 10, other components are not shown for description of positional relationship among the engine 11, the clutch 13, and the clutch driving device 14, and the engine 11, the clutch 13, and the clutch driving device 14 are simplified in the illustration.

In FIGS. 9 and 10, arrow L represents a leftward direction of the vehicle 1. Arrow R in the drawings represents a rightward direction of the vehicle 1. Arrow RR in the drawings represents a rearward direction of the vehicle 1. Arrow U in the drawings represents an upward direction of the vehicle 1. The front, the rear, the left, and the right respectively refer to the front, the rear, the left, and the right when seen from a rider driving the vehicle 1.

As illustrated in FIGS. 9 and 10, the clutch driving device 14 is disposed above the clutch 13 and behind the engine 11. The clutch driving device 14 is disposed above the clutch 13 and at the right of the clutch 13 when seen from above the vehicle 1. The clutch driving device 14 is disposed such that the axial direction of the output shaft 63 extends along the left-right direction (lateral direction) of the vehicle 1. The clutch 13 is disposed such that the axial direction of the rotating shaft 31 extends along the top-bottom direction (vertical direction) of the vehicle 1.

The clutch driving device 14 is connected to the clutch 13 through the link mechanism 16. Specifically, one end of the first arm 33 of the link mechanism 16 is connected to the rotating shaft 31 and extends toward the left of the vehicle 1. One end of the second arm 34 of the link mechanism 16 is connected to the output shaft 63 of the clutch driving device 14 and extends toward the bottom of the vehicle 1. The adjustment mechanism 35 of the link mechanism 16 connects the first arm 33 and the second arm 34 to each other such that the first arm 33 and the second arm 34 are rotatable.

In the arrangement of the link mechanism 16 as described above, a lever ratio rt that is a ratio between a shaft torque exerted on the output shaft 63 of the clutch driving device 14 and a shaft torque exerted on the rotating shaft 31 is obtained by the equation below. In the equation, the lever ratio rt is obtained on the assumption that a tilt of the adjustment mechanism 35 does not change when the link mechanism 16 operates.

$$rt = \cos\theta_2 / \cos\theta_1 \times L2/L1 \qquad (1)$$

where $\theta_1$ is an angle formed by the second arm 34 with respect to a reference line parallel to the axis of the rotating shaft 31 when the link mechanism 16 is seen from a side of the vehicle 1 (see FIG. 10), and $\theta_2$ is an angle formed by the first arm 33 with respect to a reference line parallel to the axis of the output shaft 63 when the link mechanism 16 is seen from above the vehicle 1 (see FIG. 9). In addition, L1 is a length of the second arm 34, and L2 is a length of the first arm 33.

In Equation (1), as the angle $\theta_1$ of the second arm 34 increases, $\cos\theta_1$ decreases, and thus, the lever ratio rt increases. Accordingly, when the rotation angle of the output shaft 63 of the clutch driving device 14 increases, the lever ratio rt increases. That is, when the rotation angle (actuator rotation angle) of the output gear 65 that rotates together with the output shaft 63 increases, the lever ratio rt increases.

A shaft torque generated on the output shaft 63 when a clutch reaction force is exerted on the output shaft 63 decreases as the lever ratio rt increases. Thus, as shown in FIG. 8, the shaft torque generated on the output shaft 63 by the clutch reaction force changes to be at maximum at a predetermined actuator rotation angle.

In this embodiment, in FIG. 8, in a case where the actuator rotation angle is smaller than S, the clutch 13 is in the engaged state. On the other hand, in FIG. 8, when the actuator rotation angle exceeds S, the clutch 13 shifts from the engaged state to the disengaged state. In FIG. 8, S denotes an actuator rotation angle at which the clutch 13 starts disengagement in a case where the actuator rotation angle increases and also denotes an actuator rotation angle at which engagement of the clutch plates 23 of the clutch 13 and the friction plates 24 finish engagement in a case where the actuator rotation angle decreases.

In FIG. 8, a range where the shaft torque exerted on the output shaft 63 is positive (larger than zero in FIG. 8) is a shaft torque range where the clutch 13 is engaged, and a range where the shaft torque exerted on the output shaft 63 is negative (smaller than zero in FIG. 8) is a shaft torque range where the clutch 13 is disengaged.

In the assist mechanism 70, rotation of the motor 50 causes the rotation position of the output gear 65 to change such that the actuator rotation angle increases, that is, changes the rotation position in the order of FIG. 7C, FIG.

7B, and FIG. 7A. Accordingly, a force exerted on the pin 72 of the output gear 65 from the spring 71 changes parabolically and is at maximum at a predetermined actuator rotation angle. Consequently, a shaft torque exerted on the output shaft 63 by an assist force of the clutch driving device 14 changes parabolically and is also at maximum at the predetermined actuator rotation angle.

As described above, the magnitude of the elastic restoring force of the spring 71 exerted on the pin 72 of the output gear 65 as an assist force in the rotation direction for clutch disengagement varies depending on the rotation position of the output gear 65. This is because a change of the contact point T between the first projection 71b of the spring 71 and the pin 72 along the first projection 71b in accordance with the rotation position of the output gear 65 causes the direction of a force exerted on the pin 72 from the first projection 71b to vary, and also causes the distance D between the contact point T between the pin 72 and the first projection 71b of the spring 71 and the center Q of the spring 71 to vary.

In the embodiment described above, as illustrated in FIG. 8, the shaft torque exerted on the output shaft 63 by driving of the motor 50 and the assist mechanism 70, that is, the clutch driving device 14, is mainly a shaft torque that disengages the clutch 13 (shaft torque in the negative region in FIG. 8).

In the case where the actuator rotation angle increases, the shaft torque exerted on the output shaft 63 by a clutch reaction force generated in operating the clutch 13 starts being generated at an actuator rotation angle at which the clutch 13 starts shifting from the engaged state to the disengaged state (S in FIG. 8). The shaft torque exerted on the output shaft 63 by the clutch reaction force is generated by a force that causes the output shaft 63 to rotate in a predetermined direction (hereinafter referred to as a rotation direction for clutch engagement) so as to engage the clutch 13. The clutch reaction force is generated by, for example, an elastic restoring force of the clutch spring 28 of the clutch 13.

A shaft torque exerted on the output shaft 63 by the clutch reaction force also varies parabolically at the lever ratio described above and is at maximum at an intended actuator rotation angle, as illustrated in FIG. 8.

With the configuration described above, a shaft torque as the sum of the shaft torque exerted on the output shaft 63 by the assist mechanism 70 and the shaft torque exerted on the output shaft 63 by the clutch reaction force generated in the clutch 13 has a relatively small value relative to an actuator rotation angle, as indicated by the bold line in FIG. 8. That is, the sum of the shaft torques is within a certain range in a half-clutch region illustrated in FIG. 8 (the range of the actuator rotation angle in the half-clutch state). Accordingly, the half-clutch state of the clutch 13 can be obtained in the output shaft 63 by a relatively small and stable shaft torque. The sum of the shaft torques is an actuation driving force of the motor 50 necessary for actuating the clutch 13.

That is, as described above, with an assist force generated by the assist mechanism 70, the clutch 13 can be easily changed from the engaged state to the disengaged state, and a stable half-clutch state can be obtained.

Friction Mechanism

Figure 11:
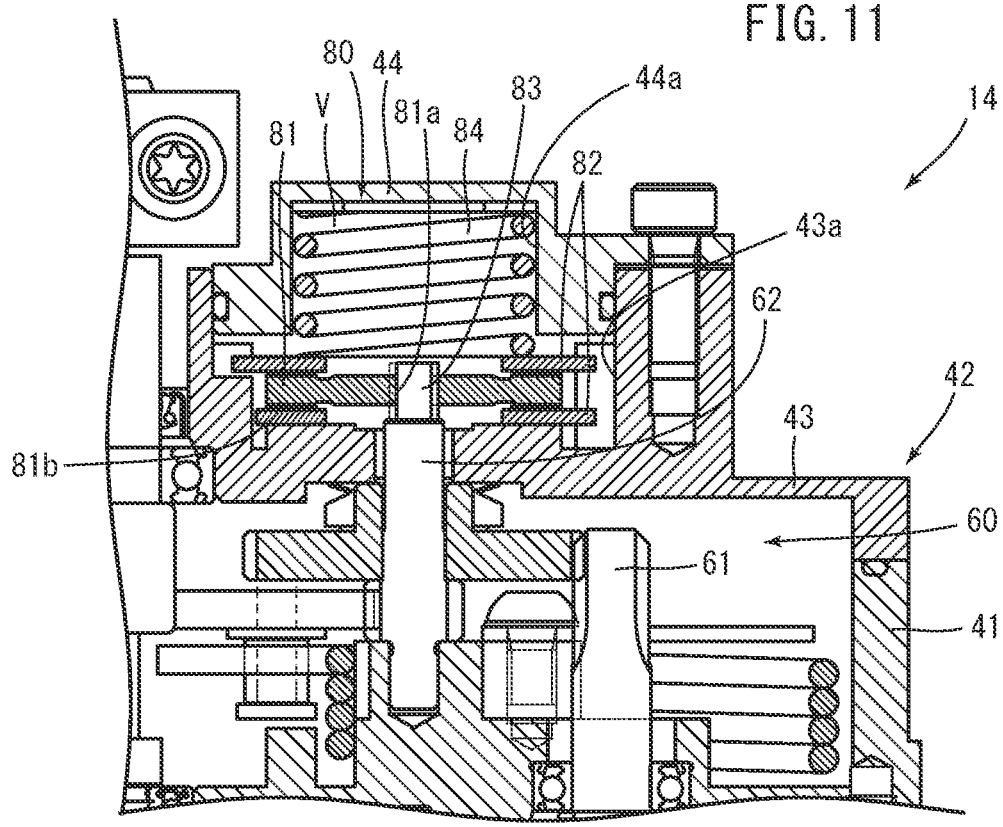
FIG. 11 is a cross-sectional view illustrating the friction mechanism in an enlarged manner.
Figure 12:
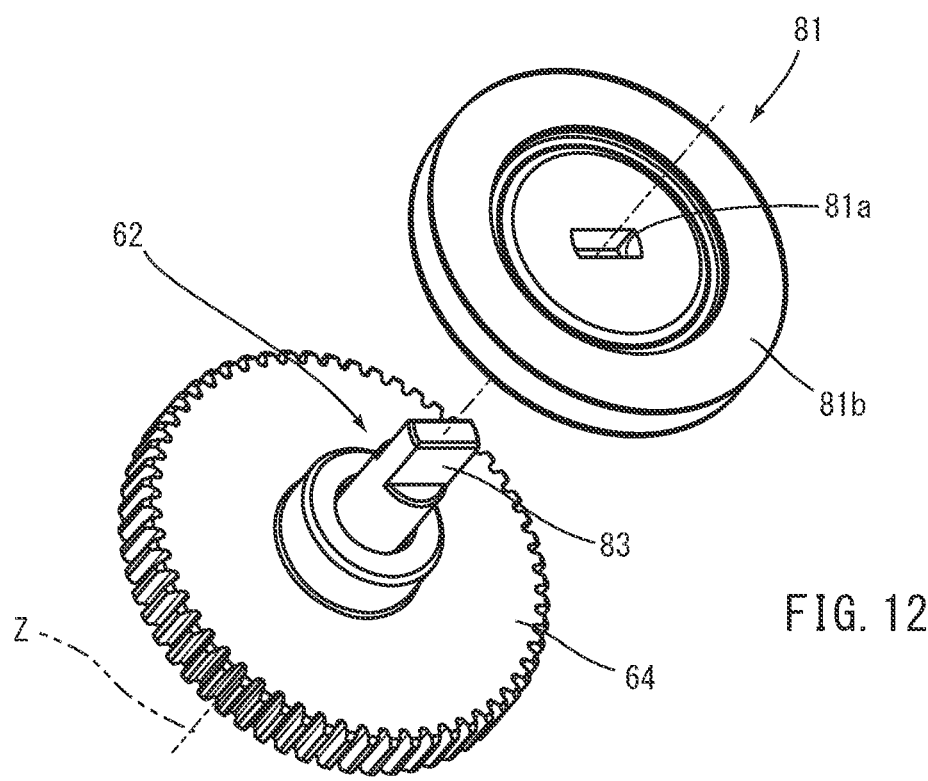
FIG. 12 is a perspective view illustrating a configuration of a rotation transfer portion and a rotation body.

Next, a configuration of the friction mechanism 80 will be described with reference to FIGS. 2 through 4, 11, and 12. FIG. 11 is a view illustrating the friction mechanism 80 in an enlarged manner. FIG. 12 is a perspective view illustrating a configuration of the rotation transfer portion 83 of the friction mechanism 80 and the rotation body. In a case where a torque exerted on the intermediate shaft 62 of the transfer mechanism 60 in the rotation direction is a predetermined value or less, the friction mechanism 80 holds the intermediate shaft 62 in a stationary state by friction between the rotation body 81 and a pair of friction plates 82. Accordingly, even when driving of the motor 50 is stopped while the vehicle is stopped, for example, the friction mechanism 80 can hold a disengaged state of the clutch 13.

Specifically, the friction mechanism 80 includes the rotation body 81, the pair of friction plates 82 (friction force generating portion), the rotation transfer portion 83 provided at one end of the intermediate shaft 62, and a spring 84 (biasing portion). The friction mechanism 80 is disposed in the storage space V defined in the cover 42 of the clutch driving device 14. Specifically, as also illustrated in FIG. 3, the friction mechanism 80 is disposed between the cover body 43 and the storage cover portion 44. Thus, in this embodiment, as illustrated in FIGS. 2 and 3, the friction mechanism 80 is disposed such that the transfer mechanism 60 is located between the friction mechanism 80 and the motor 50 in the axial direction of the output shaft 63. Accordingly, the friction mechanism 80 can be made compact without interference with the motor 50.

As illustrated in FIGS. 2 through 4 and 11, the pair of friction plates 82 is disposed at both sides in the thickness direction of the rotation body 81. That is, the pair of friction plates 82 and the rotation body 81 are stacked in the order of the friction plate 82, the rotation body 81, and the friction plate 82 in the thickness direction of the friction plates 82. Each of the friction plates 82 is a hollow disc member. At least one of both surfaces in the thickness of this hollow disc member contacting the rotation body 81 has a friction coefficient with which a predetermined friction force is obtained when the surface contacts the rotation body 81. Specifically, each of the friction plates 82 is made of, for example, a stainless plate member whose surfaces are polished. The pair of friction plates 82 and the rotation body 81 are disposed in the first recess 43a provided in the cover body 43. That is, one of the pair of friction plates 82 is in contact with the inner surface of the first recess 43a of the cover body 43.

As illustrated in FIG. 4, each of the pair of friction plates 82 has a plurality of positioning protrusions 82a on an outer peripheral portion thereof. The positioning protrusions 82a are disposed in positioning recesses 43b formed in the inner surface of the first recess 43a with the pair of friction plates 82 disposed in the first recess 43a of the cover body 43. This configuration can reduce rotation of the pair of friction plates 82 together with the rotation body 81.

The rotation body 81 is a disc-shaped metal member. As illustrated in FIG. 12, the rotation body 81 has a through hole 81a (opening portion) formed in a center portion (rotation center) of the rotation body 81 and penetrating the rotation body 81 in the thickness direction. The through hole 81a is rectangular when seen in the thickness direction of the rotation body 81. The rotation transfer portion 83 disposed at one end of the intermediate shaft 62 penetrates the through hole 81a.

The rotation body 81 has a contact portion 81b located in an outer peripheral portion of the disc-shaped rotation body 81 when seen in the thickness direction, and the contact portion 81b contacts the pair of friction plates 82. The contact portion 81b has a thickness larger than the thickness of a center portion of the rotation body 81. That is, the contact portion 81b projects from the center portion of the rotation body 81 in the thickness direction of the rotation body 81. Accordingly, the contact portion 81b of the rotation body 81 contacts the pair of friction plates 82 with the rotation body 81 disposed between the pair of friction plates 82.

As described above, the rotation transfer portion 83 is disposed at an end of the intermediate shaft 62 in the axial direction. The rotation transfer portion 83 has a columnar shape that is rectangular in cross section. The rotation transfer portion 83 is formed to be insertable in the through hole 81a of the rotation body 81. Accordingly, in a case where the intermediate shaft 62 rotates with the rotation transfer portion 83 inserted in the through hole 81a of the rotation body 81, rotation of the intermediate shaft 62 is transferred to the rotation body 81 through the rotation transfer portion 83. Thus, the friction mechanism 80 generates a friction force in a direction opposite to the rotation direction of rotation transferred by the transfer mechanism 60.

In FIG. 12, character Z is an axis of the intermediate shaft 62. The axial direction in which this axis Z extends is the same direction as the axial direction of the output shaft 63. The expression that the direction of the axis (axial direction) of the intermediate shaft 62 is the same as the axial direction of the output shaft 63 includes a case where these the axial direction of the intermediate shaft 62 is not completely the same as the axial direction of the output shaft 63 as long as rotation can be transferred between the intermediate shaft 62 and the output shaft 63.

The rotation transfer portion 83 provided in the intermediate shaft 62 is inserted in the through hole 81a of the rotation body 81 described above so that friction mechanism 80 is thereby separated from a transfer path of power from the input shaft 61 to the output shaft 63 in the transfer mechanism 60. That is, the friction mechanism 80 is not included in the transfer mechanism 60, but is separated from the transfer mechanism 60.

With the configuration described above, movement of the rotation body 81 relative to the rotation transfer portion 83 in the axial direction of the intermediate shaft 62 can be permitted while rotation of the intermediate shaft 62 is transferred to the rotation body 81 through the rotation transfer portion 83. Accordingly, even in a case where the rotation body 81 is tilted or displaced in the axial direction of the intermediate shaft 62, for example, the rotation body 81 can be relatively displaced from the rotation transfer portion 83.

The spring 84 includes a wire material extending helically about the axis. The spring 84 has a cylindrical shape extending in the axial direction. The spring 84 is a compression spring that generates an elastic restoring force when being compressed in the axial direction. The spring 84 is disposed in the storage cover portion 44 such that the axial direction coincides with the axial direction of intermediate shaft 62. That is, the axis of the spring 84 extends in the same direction as the axial direction of the output shaft 63.

The spring 84 is disposed with respect to the pair of friction plates 82 and the rotation body 81 such that the axis of the spring 84 coincides with the thickness direction of the pair of friction plates 82 and the rotation body 81. One end toward one direction along the axis of the spring 84 contacts one of the pair of friction plates 82 toward the other end in the axial direction. That is, the pair of friction plates 82 and the rotation body 81 are located closer to the rotation transfer portion 83 than the spring 84 is. In addition, one of the pair of friction plates 82 toward the one direction along the axis contacts the inner surface of the first recess 43a of the cover body 43. Accordingly, the spring 84 applies a force on the pair of friction plates 82 and the rotation body 81 in the thickness direction. Thus, the pair of friction plates 82 and the rotation body 81 are pressed in the thickness direction between the spring 84 and the inner surface of the first recess 43a of the cover body 43.

With the foregoing configuration, a friction force is generated between the pair of friction plates 82 and the rotation body 81 pressed by the spring 84 in the thickness direction. Accordingly, a force that suppresses rotation is exerted on the rotation body 81 rotating together with the intermediate shaft 62, by a friction force between the rotation body 81 and the pair of friction plates 82. Thus, in a case where a force in the rotation direction exerted on the intermediate shaft 62 is less than or equal to the friction force between the rotation body 81 and the pair of friction plates 82, the friction force suppresses rotation of the rotation body 81 and the intermediate shaft 62.

As described above, in FIG. 8, the sum of the shaft torque generated by an assist force of the clutch driving device 14 and the shaft torque generated by a clutch reaction force of the clutch 13 (indicated by the bold solid line in FIG. 8) is a shaft torque exerted on the output shaft 63 of the clutch driving device 14. In FIG. 8, a range of a shaft torque with which rotation of the rotation body 81 and the intermediate shaft 62 stops by the friction force between the rotation body 81 and the pair of friction plates 82 is indicated by dot-dot-dash lines. That is, in the shaft torque exerted on the output shaft 63, rotation of the rotation body 81 and the intermediate shaft 62 is suppressed by the friction force between the rotation body 81 and the pair of friction plates 82 in the range indicated by the dot-dot-dash lines (less than or equal to a predetermined value).

In a case where driving of the motor 50 is stopped, the clutch plates 23 and the friction plates 24 are subjected to a force with which the clutch plates 23 and the friction plates 24 are pushed against each other by the clutch spring 28 such that the clutch 13 is engaged. On the other hand, the friction mechanism 80 with the configuration described above provided in the clutch driving device 14 stops operation of the transfer mechanism 60 of the clutch driving device 14 even while driving of the motor 50 is stopped. Accordingly, the clutch 13 does not operate. Thus, with the configuration described above, self-lock capable maintaining an operation state (the half-clutch state or the disengaged state) of the clutch 13 without change can be obtained.

In addition, as described above, insertion of the rotation transfer portion 83 of the intermediate shaft 62 into the through hole 81a of the rotation body 81 allows displacement of the rotation body 81 relative to the intermediate shaft 62 in directions except the rotation direction. Accordingly, even in a case where the intermediate shaft 62 tilts, for example, rotation of the intermediate shaft 62 can be transferred to the rotation body 81 with a tilt of the rotation body 81 prevented. In this manner, it is possible to rotate the rotation body 81 by the intermediate shaft 62 while ensuring contact of the rotation body 81 with the pair of friction plates 82.

Furthermore, with the configuration described above, the rotation body 81, the friction plates 82, and the spring 84 of the friction mechanism 80 assembled in the cover 42 can be attached to the inside of the casing body 41. As a result, workability in assembly of the friction mechanism 80 can be enhanced.

Moreover, the casing housing the friction mechanism 80 is constituted by a part of the cover 42 of the clutch driving device 14. This makes the entire configuration of the clutch driving device 14 compact.

The clutch driving device 14 according to this embodiment is the clutch driving device 14 including the motor 50 for driving the clutch 13 and the transfer mechanism 60 that transfers a force in the rotation direction output from the motor 50 to the clutch 13. The clutch driving device 14 includes the friction mechanism 80 that generates a friction force in a direction opposite to the rotation direction of rotation transferred by the transfer mechanism 60. The transfer mechanism 60 includes the input shaft 61 that receives a force in the rotation direction output from the motor 50, the output shaft 63 that outputs, to the clutch 13, a force in the rotation direction transferred from the input shaft 61, and the intermediate shaft 62 that transfers a force in the rotation direction from the input shaft 61 to the output shaft 63. The friction mechanism 80 includes the rotation body 81 that rotates about the axis Z by a force in the rotation direction transferred by the transfer mechanism 60, the friction plate 82 that generates a friction force by contact with the rotation body 81, and the spring 84 that biases one of the rotation body 81 or the friction plate 82 relative to the other in an axial direction that is a direction in which the axis Z extends in such a manner that the rotation body 81 and the friction plate 82 are brought into contact with each other. The rotation transfer portion 83 that is movable in the axial direction relative to the rotation body 81 and rotates together with the rotation body 81 is provided in one of the input shaft 61, the output shaft 63, or the intermediate shaft 62.

With the configuration described above, the transfer mechanism 60 that transfers a force in the rotation direction output from the motor 50 and the friction mechanism 80 that achieves the self-lock function can be separated from each other such that only the force in the rotation direction of the transfer mechanism 60 is transferred to the friction mechanism 80. That is, the rotation transfer portion 83 that transfers, to the friction mechanism 80, the force in the rotation direction of the transfer mechanism 60 is disposed to be movable in the axial direction relative to the rotation body 81 of the friction mechanism 80. Thus, even in a case where a force in the axial direction is generated on the shaft provided with the rotation transfer portion 83 (the intermediate shaft 62 in the example of this embodiment), transfer of the force in the axial direction to the friction mechanism 80 can be prevented. Accordingly, even when a tilt or the like occurs in the transfer mechanism 60, variations in a friction force between the rotation body 81 and the friction plate 82 of the friction mechanism 80 due to the tilt can be reduced. Consequently, in the clutch driving device 14, it is possible to increase responsiveness in driving while maintaining the self-lock function.

The clutch driving device 14 further includes the casing 40 housing the transfer mechanism 60 and the friction mechanism 80. The casing 40 includes the casing body 41 housing the transfer mechanism 60 and the cover 42 housing the friction mechanism 80.

Accordingly, the transfer mechanism 60 and the friction mechanism 80 can be assembled separately. Consequently, precision in assembly of the clutch driving device 14 can be enhanced, and workability in assembly can be increased. In addition, since the friction mechanism 80 is disposed in the cover 42 constituting a part of the casing 40, the friction mechanism 80 can be easily positioned relative to the transfer mechanism 60 disposed in the casing body 41.

In a member including the rotation transfer portion 83 among the input shaft 61, the output shaft 63, and the intermediate shaft 62 (the intermediate shaft 62 in this embodiment), a part of the member projects outward of the casing body 41. Accordingly, the friction mechanism 80 can be easily positioned relative to the transfer mechanism 60. Consequently, assembly of the clutch driving device 14 can be easily performed. In addition, since the friction mechanism 80 is disposed closer to the transfer mechanism 60, variations of a friction force generated in the friction mechanism 80 can be further reduced.

The casing body 41 has a cylindrical shape having a bottom. The cover 42 is attached to the casing body 41 to cover the opening 41*a*. Accordingly, the cover 42 of the casing 40 can also serve as the casing housing the friction mechanism 80. Consequently, the clutch driving device 14 can be made compact.

The cover 42 covers the opening 41*a* of the casing body 41, and includes a cover body 43 having a first recess 43*a* capable of housing at least a part of the friction mechanism 80, and a storage cover portion 44 covering the first recess 43*a*. Accordingly, the friction mechanism 80 is housed in the cover 42, and thus, the clutch driving device 14 can be made compact.

The clutch driving device 14 includes, as a transfer element, the intermediate shaft 62 that transfers a force in the rotation direction from the input shaft 61 to the output shaft 63. The rotation transfer portion 83 is disposed in the intermediate shaft 62. The rotation transfer portion 83 provided in the intermediate shaft 62 where a thrust force is less likely to occur can further reduce variations of a friction force generated in the friction mechanism 80.

The rotation body 81 is disposed closer to the rotation transfer portion 83 than the spring 84. Accordingly, the rotation body 81 can be disposed closer to the transfer mechanism 60. Thus, rotation of the transfer mechanism 60 can be more efficiently transferred to the rotation body 81 through the rotation transfer portion 83.

The rotation body 81 has a through hole 81*a* at a rotation center thereof. The rotation transfer portion 83 is disposed in the through hole 81*a*. Accordingly, the rotation body 81 is movable in the axial direction relative to the rotation transfer portion 83. Thus, even in a case where an axial force in the axial direction is generated on the rotation transfer portion 83, transfer of the axial force to the friction mechanism 80 can be prevented while the rotation transfer portion 83 transfers rotation to the rotation body 81. Accordingly, even when a tilt or the like occurs in the transfer mechanism 60, variations in a friction force between the rotation body 81 and the friction plate 82 of the friction mechanism 80 due to the tilt can be reduced.

The friction mechanism 80 is disposed such that the transfer mechanism 60 is located between the friction mechanism 80 and the motor 50 in the axial direction. Consequently, the clutch driving device 14 can be made compact.

The transfer element includes the gears 61*a* and 62*a*, the intermediate gear 64, and the output gear 65, which are spur gears. Rotation of the input shaft 61 is transferred to the output shaft 63 through the spur gears. Transfer of rotation of the input shaft 61 to the output shaft 63 through the spur gears suppresses generation of an axial force (thrust force), as compared to worm gears. Thus, variations of a friction force generated in the friction mechanism 80 can be further reduced.

The clutch driving device 14 includes the assist mechanism 70 that applies a force in the rotation direction to the output shaft 63 to assist operation of the clutch 13. Accordingly, an axial torque exerted on the output shaft 63, that is, the sum of an axial torque exerted on the output shaft 63 by driving of the motor 50 and the assist mechanism 70, and an axial torque generated by a clutch reaction force of the clutch 13 can be reduced in a wide range of the actuator rotation angle, as compared to a case where the assist mechanism 70 is not provided. This configuration further ensures the self-lock function obtained by the friction mechanism 80 and can increase responsiveness in driving of the clutch driving device 14.

Other Embodiments

The embodiments of the present teaching have been described above, but the above embodiments are merely examples for carrying out the invention. Thus, the invention is not limited to the embodiments, and the embodiments may be modified as necessary within a range not departing from the gist of the invention.

In the embodiment, the friction mechanism 80 is housed in the storage space V defined between the cover body 43 of the cover 42 and the storage cover portion 44 in the clutch driving device 14. However, any configuration may be employed as long as at least a part of the friction mechanism 80 is disposed in the cover 42.

Figure 13:
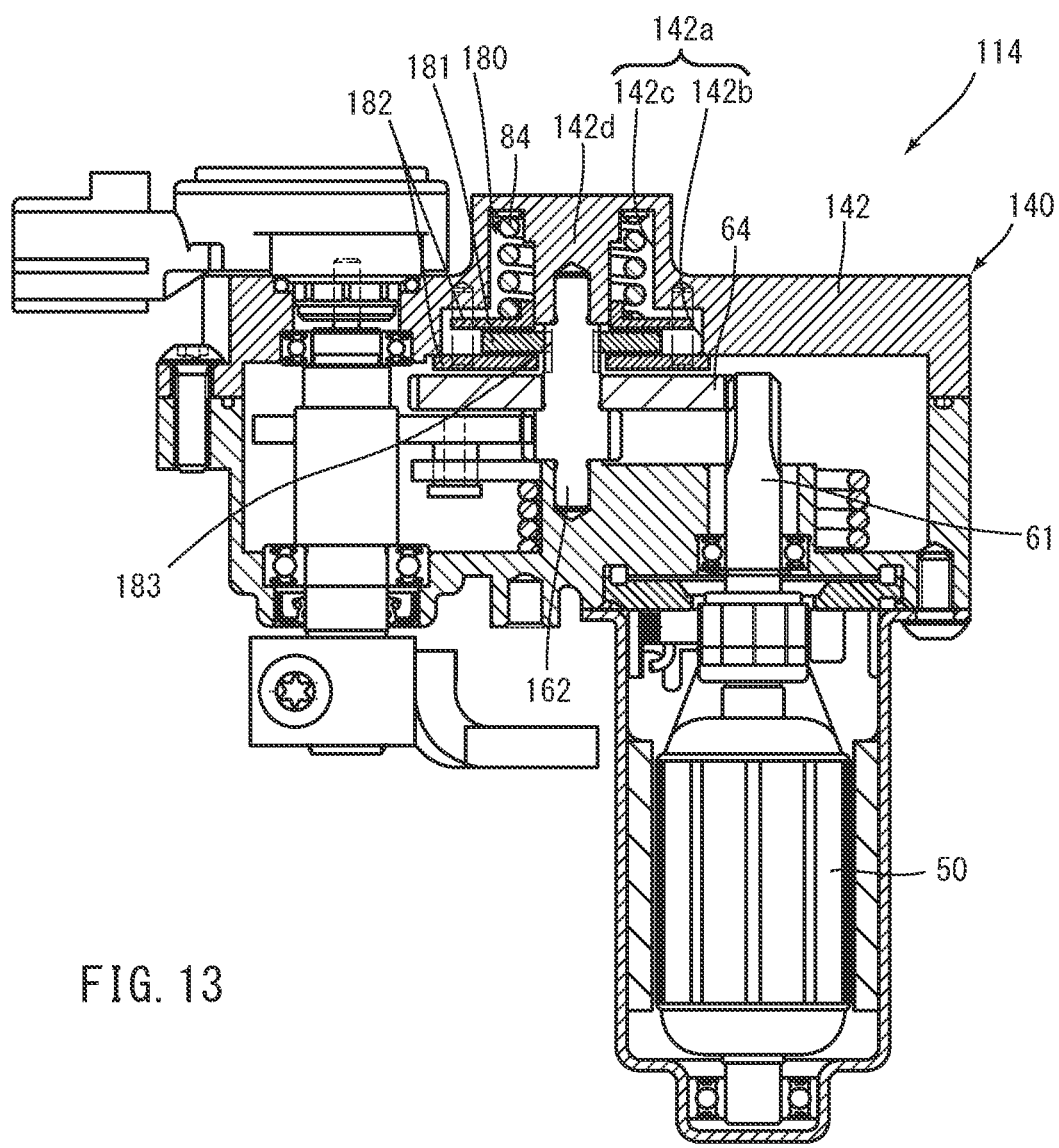
FIG. 13 is a view corresponding to FIG. 3 and illustrating a schematic configuration of a clutch driving device according to another embodiment.

For example, as illustrated in FIG. 13, the clutch driving device 114 may be configured such that the friction mechanism 180 is disposed in a recess 142a formed in the cover 142 of the casing 140. In the configuration illustrated in FIG. 13, components similar to those of the above embodiment are denoted by the same reference characters and will not be described again, and components different from those of the above embodiment will be described.

In the example illustrated in FIG. 13, the recess 142a includes a circular first recess 142b and an annular second recess 142c, when seen along the thickness of the cover 142.

The first recess 142b is disposed inward of the second recess 142c in the casing 140. That is, the second recess 142c is disposed at the bottom of the first recess 142b.

The second recess 142c surrounds a columnar projection 142d. The spring 84 is disposed in the second recess 142c. With the spring 84 being disposed in the second recess 142c, the projection 142d is positioned inside the spring 84. The projection 142d rotatably supports one axial end of an intermediate shaft 162.

The intermediate shaft 162 includes a rotation transfer portion 183 in a portion closer to the axial center than the end supported by the projection 142d. Similarly to the embodiment described above, the rotation transfer portion 183 also has a rectangular cross section when the intermediate shaft 162 is seen in the axial direction. Thus, by inserting the rotation transfer portion 183 of the intermediate shaft 162 in the through hole 81a of a rotation body 181, rotation of the intermediate shaft 162 can be transferred to the rotation body 181 through the rotation transfer portion 183.

A pair of friction plates 182 and the rotation body 181 are stacked in the thickness direction in the first recess 142b. The pair of friction plates 182 disposed in the first recess 142b is bolted to the cover 142. Accordingly, the stack of the friction plates 182 and the rotation body 181 is fixed to the cover 142. Since the spring 84 is disposed in the second recess 142c as described above, the pair of friction plates 182 and the rotation body 181 are pressed by the spring 84 in the thickness direction. Consequently, a friction force is generated between the pair of friction plates 182 and the rotation body 181.

In the configuration illustrated in FIG. 13, the friction mechanism 180 can be disposed in a compact size to the casing 140 of the clutch driving device 114. Accordingly, the clutch driving device 114 can be made compact.

In the embodiment described above, the clutch 13 is configured to be in an engaged state in which the clutch plates 23 and the friction plates 24 are engaged in a case where a driving force of the clutch driving device 14 is not applied to the push rod 29. Alternatively, the clutch may be configured to be in a disengaged state in which the clutch plate 23 and the friction plate 24 are disengaged in the case where the driving force is not applied to the push rod 29. In this case, in a case where the actuator rotation angle is zero, the clutch is disengaged. Thus, the assist mechanism generates an assist force mainly in engaging the clutch. In such a case, if the shaft torque exerted on the output shaft 63 is a predetermined value or less, the friction mechanism 80 can suspend rotation of the intermediate shaft 62, that is, suspend operation of the clutch. Accordingly, even when the motor 50 stops, the friction mechanism 80 can keep the engaged state of the clutch.

In the embodiment described above, the clutch driving device 14 includes the intermediate shaft 62 as the transfer element for transferring rotation from the input shaft 61 to the output shaft 63. Alternatively, the transfer element may be constituted by gears. The transfer element may be any part as long as the part can transfer rotation of the input shaft 61 to the output shaft 63.

Figure 14:
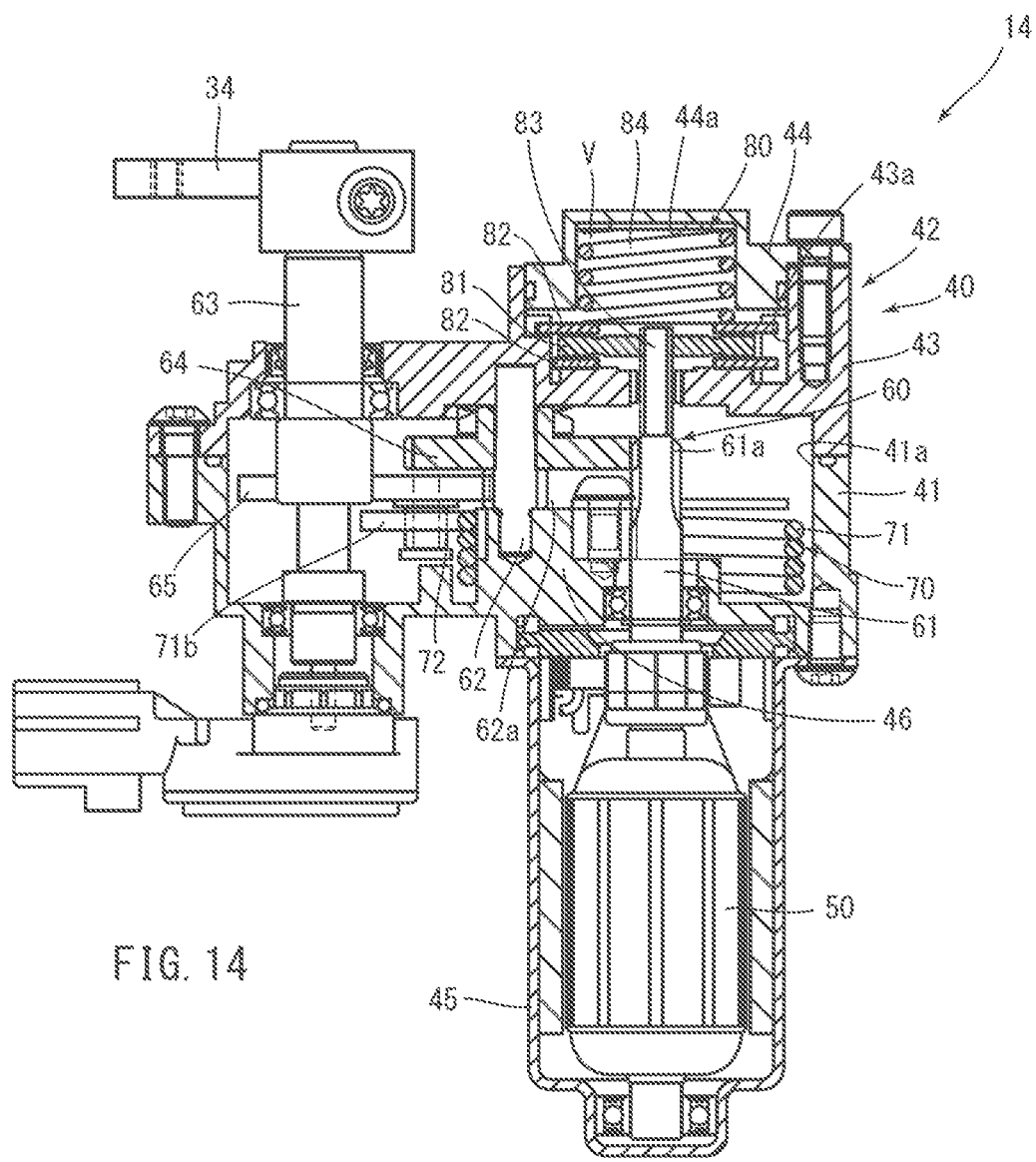
FIG. 14 is a view corresponding to FIG. 3 and illustrating a schematic configuration of a clutch driving device according to another embodiment.
Figure 15:
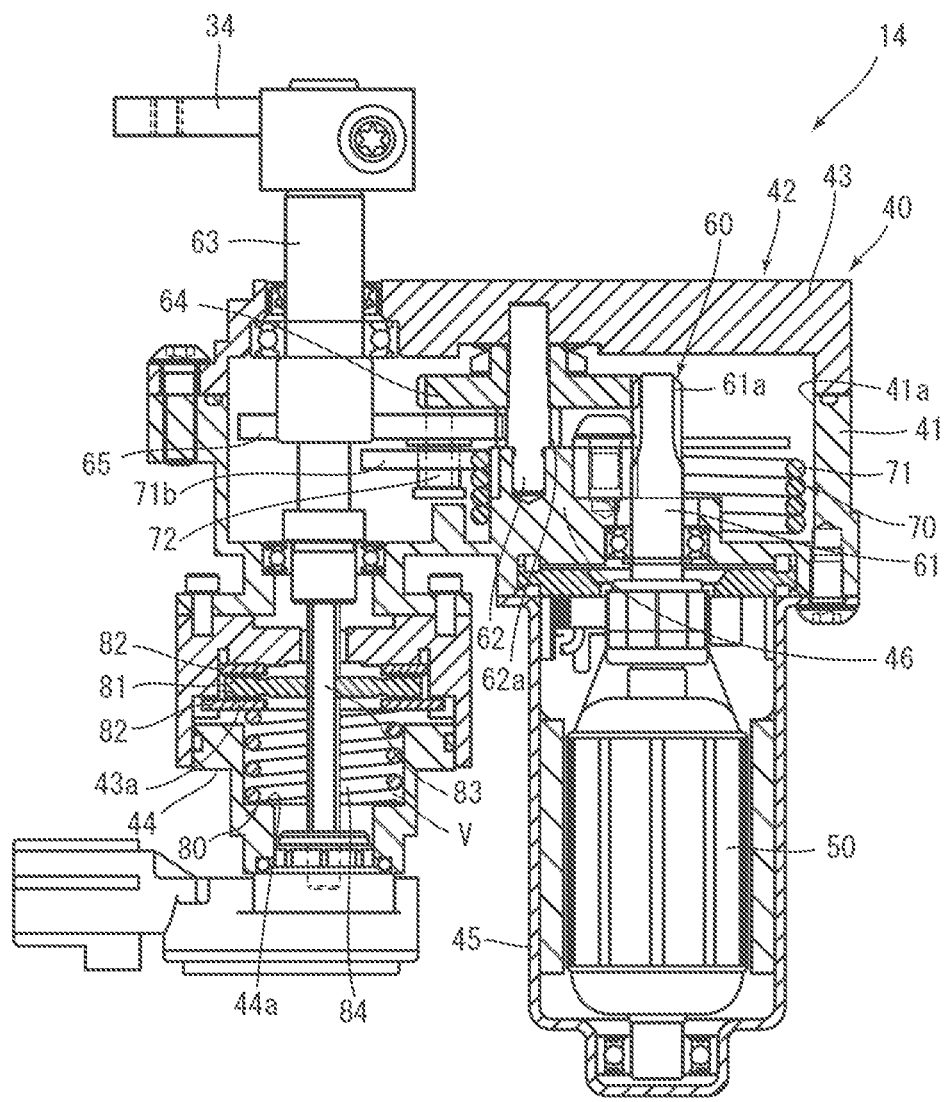
FIG. 15 is a view corresponding to FIG. 3 and illustration a schematic configuration of a clutch driving device according to another embodiment.

In the embodiment described above, the rotation transfer portion 83 of the friction mechanism 80 is provided in the intermediate shaft 62. Alternatively, the rotation transfer portion 83 may be disposed in the input shaft 61 as illustrated in FIG. 14. The rotation transfer portion 83 may be disposed in the output shaft 63 as illustrated in FIG. 15.

In the embodiment described above, the transfer mechanism 60 is disposed between the friction mechanism 80 and the motor 50 in the axial direction of the output shaft 63. Alternatively, the friction mechanism 80 may be disposed at a side of the motor 50 in a direction intersecting with the axial direction.

In the embodiment described above, the storage space V in the cover 42 is constituted by the first recess 43a formed in the cover body 43 and the second recess 44a formed in the storage cover portion 44. Alternatively, the storage space V in the cover 42 may be constituted by a recess formed in one of the cover body or the storage cover portion. That is, the recess may be formed in one of the cover body or the storage cover portion with no recess being formed in the other.

In the embodiment described above, the friction mechanism 80 includes the pair of friction plates 82. Alternatively, one friction plate 82 may be disposed to the rotation body 81. A portion having a friction coefficient that generates a predetermined friction force by contact with the rotation body 81 may be provided in another member that contacts the rotation body 81 (e.g., a part of the cover 42) as long as the portion is capable of generating a friction force with the rotation body 81.

In the embodiment described above, the rotation body 81 has the through hole 81a in which the rotation transfer portion 83 provided in the intermediate shaft 62 is inserted. Alternatively, the rotation body 81 may have a recess which does not penetrate the rotation body 81 and in which at least a part of the rotation transfer portion 83 is located in this recess.

In the embodiment described above, each of the through hole 81a and the rotation transfer portion 83 has a rectangular cross section. Alternatively, the cross section of each of the through hole 81a and the rotation transfer portion 83 may be in any shape, such as a triangle or a pentagon, as long as the rotation transfer portion 83 can transfer rotation of the intermediate shaft 62 to the rotation body 81.

In the embodiment described above, the spring 84 of the friction mechanism 80 is a compression spring including a wire material extending helically about the axis. Alternatively, the structure for pressing the pair of friction plates 82 and the rotation body 81 in the thickness direction may be a structure other than the compression spring as long as the structure can press the pair of friction plates 82 and the rotation body 81 in the thickness direction.

In the embodiment, in the clutch driving device 14, the gears 61a and 62a, the intermediate gear 64, and the output gear 65 that transfer rotation of the input shaft 61 to the output shaft 63 are spur gears. Alternatively, at least one of the gears may be a spur gear and the others may be gears of other shapes. All the gears may be other than spur gears.

In the embodiment, the input shaft 61 is provided with the gear 61a, and the intermediate shaft 62 is also provided with the gear 62a. The gear 61a may be integrally provided to the input shaft 61 or may be a member separated from the input shaft 61. The gear 62a may be integrally provided to the intermediate shaft 62 or may be a member separated from the intermediate shaft 62.

In the embodiment described above, the driving force of the clutch driving device 14 is transferred to the clutch 13 through the linkage mechanism 16. Alternatively, the driving force of the clutch driving device 14 may be transferred to the clutch 13 by a structure other than the linkage mechanism, such as a rotatable lever. That is, any structure other than the linkage mechanism may be used as long as the structure can transfer an output of the clutch driving device 14 to the clutch 13.

In the embodiment described above, the spring 71 of the assist mechanism 70 includes the first projection 71b projecting radially outward. The first projection 71b contacts the pin 72 provided on the output gear 65. That is, in the embodiment described above, the contact point T between the first projection 71b and the pin 72 is located radially outside the spring 71. Alternatively, the contact point T may be located radially inside the spring. That is, the first projection may extend radially inward of the spring. The output gear may be located inside the spring or outside the spring when seen in the axial direction of the output shaft 63.

In the embodiment described above, the pin 72 provided on the output gear 65 directly contacts the first projection 71b of the spring 71 in the assist mechanism 70. Alternatively, the output gear may be provided with a link mechanism so that a part of the link mechanism contacts the first projection 71b.

In the embodiment described above, the spring 71 of the assist mechanism 70 includes the first projection 71b and the second projection 72c extending toward the output shaft 63 when seen in the axial direction of the output shaft 63 in a state where the spring 71 is disposed inside the casing 40. Alternatively, the second projection 72c may extend in a direction different from the first projection 71b as long as the second projection 71c can contact the inner surface of the casing body 41 so that the spring 71 is twisted in the circumferential direction when the first projection 71b is displaced by rotation of the output gear 65.

In the embodiment described above, when the spring 71 of the assist mechanism 70 is deformed such that the first projection 71b approaches the second projection 72c, the spring 71 is twisted in the circumferential direction to generate an elastic restoring force. The assist mechanism 70 outputs this elastic restoring force as an assist force for driving of the clutch 13. The assist mechanism, however, may be configured to output an elastic restoring force generated when the spring is deformed to cause the first projection to move away from the second projection as an assist force for driving of the clutch 13.

In the embodiment described above, the clutch driving device 14 includes the assist mechanism 70 including the spring 71 as a torsion spring. The assist mechanism 70, however, may be constituted by a configuration other than the spring 71 as a torsion spring as long as the assist mechanism 70 is capable of outputting an assist force for driving of the clutch 13. The clutch driving device 14 may not include the assist mechanism 70.

In the embodiment described above, the clutch driving device 14 includes the motor 50 that rotates the input shaft 61. Alternatively, a structure other than the motor may be applied to the clutch driving device 14 as long as the structure can rotate the input shaft 61.

In the embodiment described above, the cylinder axial direction of the casing 40, the axial direction of the input shaft 61, the intermediate shaft 62, and the output shaft 63, the axial direction of the springs 71 and 84, and the thickness direction of the friction plate 82 and the rotation body 81 are the same. Alternatively, the cylinder axial direction of the casing 40, the axial direction of the input shaft 61 and the output shaft 63, and the axial direction of the springs 71 and 84 may be different from one another as long as the axial direction (axial direction) of the intermediate shaft 62 and the thickness direction of the friction plate 82 and the rotation body 81 are the same. The cylinder axial direction of the casing 40, the axial direction of the input shaft 61 and the output shaft 63, and the axial direction of the springs 71 and 84 may be different from one another. The expression in which the axial direction of the intermediate shaft 62 and the thickness direction of the friction plate 82 and the rotation body 81 are the same include a case where these directions are not strictly the same as long as the self-lock function of the friction mechanism 80 can be achieved.

The embodiments described above have been directed to motorcycles as an example of the vehicle 1, but the vehicle 1 may have any configuration such as a three-wheeled vehicle or a four-wheeled vehicle as long as the configuration includes a clutch driving device for driving a clutch.

DESCRIPTION OF REFERENCE CHARACTERS 1 vehicle
13 clutch
14, 114 clutch driving device
40, 140 casing
41 casing body (first casing portion)
41a opening
42, 142 cover (second casing portion)
43 cover body
43a first recess
44 storage cover portion (lid portion)
44a second recess
50 motor (driving unit)
60 transfer mechanism
61 input shaft
61a gear
62 intermediate shaft (transfer element)
62a gear 63 output shaft
64 intermediate gear
65 output gear
70 assist mechanism
80, 180 friction mechanism
81, 181 rotation body
81a through hole (opening portion)
81b contact portion
82, 182 friction plate (friction force generating portion)
83, 183 rotation transfer portion
84 spring (biasing portion)
142a recess
142b first recess
142c second recess
V storage space
Z axis

What is claimed is:

1. A clutch driving device including an actuator for driving a clutch and a transfer mechanism that transfers, to the clutch, a rotation force output from the actuator, the clutch driving device comprising:
a friction mechanism that generates a friction force in a direction opposite to a rotation direction of the rotation force, wherein
the transfer mechanism includes
an input shaft that receives the rotation force output from the actuator,
an output shaft that outputs the rotation force to the clutch, and
an intermediate member that transfers the rotation force from the input shaft to the output shaft,
the friction mechanism includes
a rotation body that rotates about an axis in response to the rotation force transferred by the transfer mechanism,
a friction plate that generates the friction force by contact with the rotation body, and
an elastic body that biases one of the rotation body or the friction plate relative to the other in an axial direction such that the rotation body and the friction plate are brought into contact with each other, the axial direction being a direction in which the axis extends, and
one of the input shaft, the output shaft, or the intermediate member includes a rotation transfer member that rotates together with the rotation body and is disposed to be movable in the axial direction relative to the rotation body.

2. The clutch driving device according to claim 1, further comprising:
a casing housing the transfer mechanism and the friction mechanism, wherein
the casing includes a first casing portion housing the transfer mechanism and a second casing portion housing the friction mechanism.

3. The clutch driving device according to claim 2, wherein one of the input shaft, the output shaft, or the intermediate member including the rotation transfer member partially projects out of the first casing portion.

4. The clutch driving device according to claim 2, wherein the first casing portion has a cylindrical shape having an end, and
the second casing portion is attached to the first casing portion to cover an opening of the first casing portion.

5. The clutch driving device according to claim 3, wherein the first casing portion has a cylindrical shape having an end, and
the second casing portion is attached to the first casing portion to cover an opening of the first casing portion.

6. The clutch driving device according to claim 4, wherein the second casing portion includes
a cover body that covers the opening of the first casing portion and includes a housing recess capable of housing at least a part of the friction mechanism, and
a lid portion covering the housing recess.

7. The clutch driving device according to claim 5, wherein the second casing portion includes
a cover body that covers the opening of the first casing portion and includes a housing recess capable of housing at least a part of the friction mechanism, and
a lid portion covering the housing recess.

8. The clutch driving device according to claim 1, wherein the intermediate member includes an intermediate shaft that transfers the rotation force from the input shaft to the output shaft, and
the rotation transfer member is disposed in the intermediate shaft.

9. The clutch driving device according to claim 1, wherein the rotation body is located closer to the rotation transfer member than to the elastic body.

10. The clutch driving device according to claim 1, wherein
the rotation body has an opening portion at a rotation center of the rotation body, and
the rotation transfer member is located in the opening portion.

11. The clutch driving device according to claim 1, wherein
the friction mechanism is disposed such that the transfer mechanism is located between the friction mechanism and the actuator in the axial direction.

12. The clutch driving device according to claim 1, wherein
the intermediate member includes a spur gear, and
rotation of the input shaft is transferred to the output shaft through the spur gear.

13. The clutch driving device according to claim 1, further comprising
an assist member that applies, to the output shaft, an assist force in the rotation direction to assist operation of the clutch.

14. A vehicle comprising the clutch driving device according to claim 1.

* * * * *